US006762794B1

(12) United States Patent
Ogino

(10) Patent No.: US 6,762,794 B1
(45) Date of Patent: Jul. 13, 2004

(54) IMAGE PICK-UP APPARATUS FOR STEREOSCOPE

(75) Inventor: Shigeru Ogino, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/203,997

(22) Filed: Dec. 1, 1998

(30) Foreign Application Priority Data

Dec. 3, 1997 (JP) .............................. 9-332995
Nov. 13, 1998 (JP) .......................... 10-323691

(51) Int. Cl.[7] .................. G03B 35/00; H04N 9/097; H04N 13/02; H04N 13/00; G02B 27/22
(52) U.S. Cl. ......................... 348/262; 348/47; 348/53; 352/57; 359/476; 396/325
(58) Field of Search .............................. 348/44, 46, 47; 348/49, 51, 54, 55, 56, 57, 58, 78, 262; 352/57; 351/201; 353/7, 8; 359/473, 476; 396/325, 334

(56) References Cited

U.S. PATENT DOCUMENTS

| | | | |
|---|---|---|---|
| 4,751,570 A | | 6/1988 | Robinson ..................... 358/88 |
| 5,343,238 A | * | 8/1994 | Takata et al. ............... 348/556 |
| 5,532,777 A | * | 7/1996 | Zanen ........................ 396/326 |
| 5,534,918 A | * | 7/1996 | Torii et al. ..................... 348/53 |
| 5,625,408 A | * | 4/1997 | Matsugu et al. .............. 348/42 |
| 5,699,108 A | * | 12/1997 | Katayama et al. ............ 348/47 |
| 5,798,791 A | * | 8/1998 | Katayama et al. ....... 348/218.1 |
| 5,801,760 A | * | 9/1998 | Uomori ........................ 348/47 |
| 5,828,913 A | * | 10/1998 | Zanen ........................ 396/324 |
| 5,864,359 A | * | 1/1999 | Kazakevich ................. 348/45 |
| 5,864,360 A | * | 1/1999 | Okauchi et al. .............. 348/47 |
| 6,088,006 A | * | 7/2000 | Tabata ............................ 345/7 |
| 6,151,061 A | * | 11/2000 | Tokuhashi ................... 348/51 |
| 6,236,428 B1 | * | 5/2001 | Fukushima .................. 348/42 |
| 6,414,681 B1 | * | 7/2002 | Ohshima et al. ........... 345/428 |
| 6,449,309 B1 | * | 9/2002 | Tabata ................... 375/240.01 |
| 6,570,566 B1 | * | 5/2003 | Yoshigahara ................ 348/47 |

FOREIGN PATENT DOCUMENTS

| | | | |
|---|---|---|---|
| EP | 0 269 075 A1 | 6/1988 | |
| EP | 0 641 132 A1 | 8/1994 | |
| EP | 0641132 A1 * | 3/1995 | .......... H04N/13/00 |
| EP | 0 811 876 A1 | 12/1997 | |
| EP | 0811876 A1 * | 12/1997 | .......... G03B/35/10 |
| JP | 01-147444 | 6/1989 | |
| JP | 05-068188 | 3/1993 | |
| JP | 7-67023 | 8/1993 | |

OTHER PUBLICATIONS

Talukdar et al.; "Stereoscopic X-ray Angiography"; 1997, Proceedings—19th International Conference—IEEE/EMBS.*
Redert et al.; "Synthesis of Multi Viewpoint Images at Non-Intermediate Positions"; 1997; IEEE pp. 2749–2752.*
Hosotani et al.; Fiberscope-type Environmental Monitoring Devices with Binocular Parallax Accomodation Mechanism for Stereoscopic Observation; 1997; IEEE; pp. 400–405.*
European Search Report for corresponding European Application 98122894.3 (Feb. 9, 2001).

* cited by examiner

Primary Examiner—Wendy R. Garber
Assistant Examiner—John M Villecco
(74) Attorney, Agent, or Firm—Morgan & Finnegan, L.L.P.

(57) ABSTRACT

An image pick-up apparatus for capturing parallax images for the left eye and right eye which meet a fusion condition. A stereo camera image-captures a subject and displays captured parallax images on a stereoscopic display. An observer looks at the screen of the display. The lines of sight of both eyes of the observer are then detected, and a distance from the view point of the observer to the subject is measured based on the line-of-sight data. Instead of the observer, the apparatus determines whether the subject distance satisfies the fusion condition. The apparatus thus determines an image-fusible range, based on a (known) convergence angle, a (known) base line distance, a (known) size of the display, and the distance of distinct vision of the observer.

28 Claims, 14 Drawing Sheets f: FOCAL LENGTH OF LIGHT RECEIVING LENS
m: BASE LINE DISTANCE

IMAGE PICK-UP APPARATUS FOR STEREOSCOPE

BACKGROUND OF THE INVENTION

1. Field of the Invention

The present invention relates to an image pick-up apparatus for stereoscope for picking up parallax images for stereoscopic viewing. More particularly, the present invention relates to an image pick-up apparatus for picking up, without user intervention, parallax images that satisfy binocular fusion conditions and an image pick-up apparatus that lets a user know whether the binocular fusion conditions are satisfied.

2. Description of the Related Art

Some known stereoscopic image pick-up apparatuses capture parallax images from a plurality of view points using a plurality of cameras. In such a stereoscopic image pick-up apparatus, a plurality of cameras are mounted on tripod heads, and a user manually adjusts a spacing and a convergence angle between camera axes, based on his or her operational experience, depending on a scene to be captured, and image-captures the scene while actually observing the stereoscopic view on a monitor.

Such an experience-based operation is not efficient, and no good result is expected when there is no one available who has a good knowledge of picking up stereoscopic images.

Head-mounted displays and eyeglass-type displays have been developed today, and these displays let an image for the right eye to be selectively presented on the right eye and an image for the left eye to be selectively presented on the left eye. A stereoscopic image producing a depth perception is thus observed. A liquid-crystal display is combined with a lenticular sheet having a predetermined pitch or a mask with apertures and non-apertures formed in a predetermined pattern to impart a directivity to a light ray from the liquid-crystal display, and by making the directivity match the pattern of the image presented on the liquid-crystal display, the observer watches the image for the right eye on the right eye and the image for the left eye on the left eye. The observer thus enjoys the image presenting depth.

Conventionally, the image presented is typically acquired through a binocular-type camera having two lens sets. An apparatus, disclosed in Japanese Examined Patent Publication No. 8-27499 (telescopic television image pick-up apparatus), does not require two lens sets. This apparatus includes two liquid-crystal shutters, a total reflection mirror and a half mirror and picks up alternately left and right parallax images through a single lens set.

Regardless of the above binocular system or the system picking up alternately left and right images in a time division manner, the adjustment of a parallax between left and right images, namely, the adjustment of convergence is required during image-capturing. The convergence adjustment is typically manually performed.

The above binocular-type camera employs two lens sets, one for forming the image for the right eye and the other for forming the image for the left eye, and the user feels fatigue when observing a stereoscopic image or cannot to attain image fusion at all, if performance differences due to manufacturing error (for example, in magnification, deviation in optical axis, tint, brightness, distortion, field tilt and the like) are present between the two lenses. To make the two lens sets match in performance, the accuracy of components needs to be heightened. Adjustment is further required if the improved accuracy of components is still not sufficient enough. To compensate for performance difference, special means is used, for example, images are electronically corrected. When a zoom lens is used, the zoom variator operations of the left and right lens sets must be interlocked in a state with these performances factored in. This arrangement is costly and time consuming to manufacture, and is inadequate for mass production.

To observe the images picked up by the binocular-type camera, two monitors are typically required. The use of the two monitors is not practical. To record the two images, a special recording device is needed to synchronize the one image to the other. Without using it, the conversion of two image signals into one image signal is contemplated. To covert the two image signals into one image signal, however, a special converter is required to alternately display and record the left and right parallax images. Compared with a single lens camera, the binocular-type camera itself is bulky. The entire system of the image pick-up apparatus, in need of the above-described special devices, fails to achieve widespread commercial acceptance among users because of its bulkier, costlier and less mobile design.

The time-division camera proposed in the above-cited Japanese Examined Patent Publication No. 8-27499 combines the optical paths for left and right parallax images at a half mirror into one optical path to guide images to a single lens. When images are transmitted through or reflected from the half mirror before entering the lens, the quantity of light is reduced to half or smaller. The arrangement disclosed in the above-cited Japanese Examined Patent Publication No. 8-27499 theoretically presents a difference between the lengths of the optical paths of the left and right parallax images, suffering a magnification difference between the left and right images. This becomes a cause of the fatigue of the user when he or she observes the images picked-up, and as a result, the user cannot observe the images fused and cannot observe them in a stereoscopic view.

SUMMARY OF THE INVENTION

Accordingly, it is an object of the present invention to provide an image pick-up apparatus through which a user or viewer easily learns during image-picking up whether a main subject falls within a range of image fusion.

The object of the present invention is achieved by the image pick-up apparatus for capturing images for stereoscopic viewing, which comprises image pick-up means for picking up left and right parallax images of a main subject respectively for the left and right eyes, display means for displaying the left and right parallax images, picked up by the image pick-up means, line-of-sight detection means for detecting the lines of sight of the left and right eyes, looking the respective images displayed by the display means, and determining means for determining, based on the output of the line-of-sight detection means, whether the main subject falls within an image-fusible range. The apparatus detects the lines of sight of an observer who observes the display means on which the left parallax image and right parallax image are presented, and, instead of the observer, determines, based on the lines of sight, whether the subject falls within the image-fusible range.

In a preferred embodiment of the preset invention, the determination result provided by the determining means is reported to the user.

In a preferred embodiment of the present invention, an image-fusible range is defined by the inter-pupillary distance and the distance of distinct vision of a user.

In a preferred embodiment of the present invention, the image date of the parallax images is stored in a memory in response to the output of the determining means.

Since the detected lines of sight of the user are the ones that look toward the display parallax images, the data about the lines of sight need to be converted into those in the coordinate systems of the image pick-up means. In a preferred embodiment of the present invention, the line-of-sight detection means further comprises converting means for converting the left and right lines of sight of a user into left and right direction vectors that are respectively expressed in left and right coordinate systems of the image pick-up means, and coordinates calculator means for calculating the coordinate values of the crossing point of the left and rightdirection vectors in the world coordinate system.

In a preferred embodiment of the present invention, the image-fusible range is expressed according to a farthest position and a nearest position from the view point of the user in the direction of depth. In a preferred embodiment, the farthest position of the image-fusible range is set to be a point so that the horizontal distance between two second points on the left and right image planes of the image pick-up means corresponding to a first point (A) of the farthest position is substantially equal to the inter-pupillary distance of the user. The nearest position of the image-fusible range is set to be a point so that a position (C') where two points on the left and right image planes of the image pick-up means corresponding to a first point (C) of the nearest position, through perspective transformation based on the left and right view points of the user, look standing out to the user, is approximately equal to the point at the distance of distinct vision of the user.

It is another object of the present invention to provide an image pick-up apparatus that is compact, low-cost, features mobility and expandability, and presents a high-quality stereoscopic image.

It is yet another object of the present invention to reduce the work load of a user or viewer during image-picking up by automating the convergence control and to enable the user to capture a natural-looking stereoscopic image.

These objects are achieved by the image pick-up apparatus, which comprises a first optical system and a second optical system with a predetermined convergence angle made therebetween, a first electronic shutter and a second electronic shutter for electronically blocking the respective optical paths of the first and second optical systems, control means for driving the first and second electronic shutters in a time-division manner, optical path integrator means for integrating the optical paths of the first and second optical systems, a third optical system having the integrated optical path, a charge-coupled device for photoelectrically converting an optical image transmitted through the third optical system, reading means for reading the output of the charge-coupled device in a time-division manner in synchronization with time-division driving of the first and second electronic shutter by the control means, distance measuring means for measuring a distance to a subject, and adjusting means for adjusting the convergence angle between the first and second optical systems in accordance with the measured distance.

The image pick-up apparatus is further made compact by incorporating the optical path integrator means which comprises a prism arranged at the entrance of the optical path of the third optical system, a first mirror for deflecting the optical path of the first optical system toward the prism, a second mirror for deflecting the optical path of the second optical system toward the prism, and the adjusting means which comprises angle adjusting means for controlling the angles of pivot of the first and second mirrors.

In a preferred embodiment of the present invention, the angle adjusting means pivots the first and second mirrors in the same angles but in opposite directions.

A variety of methods may be used to measure the distance to the subject. More particularly, in a preferred embodiment of the present invention, the distance measuring means uses a triangulation method. In a preferred embodiment of the present invention, distance measurement is performed based on position information about the plurality of lenses used in the first and second optical systems.

The distance to the subject changes. It is necessary to obtain proper parallax images of the subject, the distance to which is changed.

To achieve this object, in a preferred embodiment of the present invention, the image pick-up apparatus further comprises detector means for detecting a change, in the distance to the subject, in excess of a predetermined value, and activating means for activating the adjusting means in response to the output of the detector means.

To achieve the same object, in a preferred embodiment of the present invention, the image pick-up apparatus further comprises detector means for detecting a predetermined number or larger number of occurrences of changes in the distance to the subject, each change in excess of a predetermined value, and activating means for activating the adjusting means in response to the output of the detector means.

In a preferred embodiment of the present invention, the image pick-up apparatus further comprises a camera main unit for processing an output signal from the charge-coupled device, a lens unit for driving the optical systems, and an interconnection unit for electrically connecting the camera main unit to the lens unit.

In a preferred embodiment of the present invention, in order to seek further the expandability and compact design, the image pick-up apparatus further comprises a camera mount for the camera main unit and a lens mount for the lens unit, wherein the lens unit is detachably mounted onto the camera main unit.

DETAILED DESCRIPTION OF THE INVENTION

Figure 1:
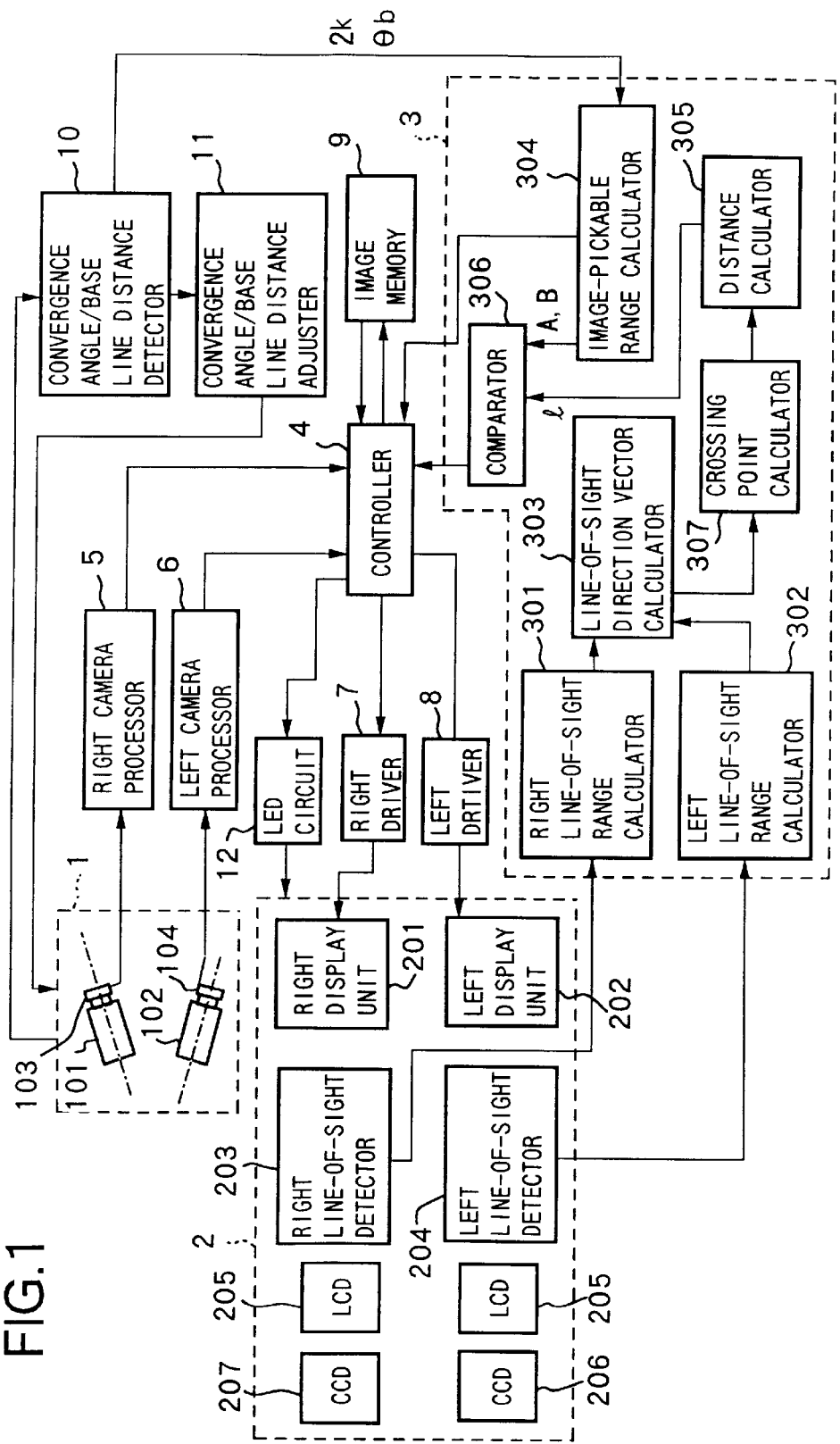
FIG. 1 is a block diagram showing the construction of a first embodiment of the present invention.

Referring to the drawings, the preferred embodiments (first and second embodiments) of the present invention are now discussed.

<First Embodiment> . . . Hardware Structure

FIG. 1 is a block diagram showing the construction of a "stereoscopic image pick-up apparatus" according to a first embodiment of the present invention.

Referring to FIG. 1, there is shown a stereo camera 1 for capturing a plurality of parallax images, and in the first embodiment, the stereo camera 1 comprises a right optical system 101 for capturing a parallax image for the right eye and CCD 103 of a photoelectric converter and a left optical system 102 for capturing a parallax image for the left eye and CCD 104 of a photoelectric converter.

The pair of optical system 101 and CCD 103 is identical in optical specification to the pair of optical system 102 and CCD 104. The optical system 101 and CCD 103 and the optical system 102 and CCD 104 are arranged so that the spacing between the two pairs (hereinafter referred to as a base line distance) and the angle made between the two pairs (hereinafter referred to as a convergence angle) are variably set with an unshown mechanism. The base line distance and the convergence angle are adjusted by a known convergence/base line distance adjuster 11.

A convergence angle/base line distance detector 10 detects the convergence angle and base line distance with its unshown encoder.

Figure 2:
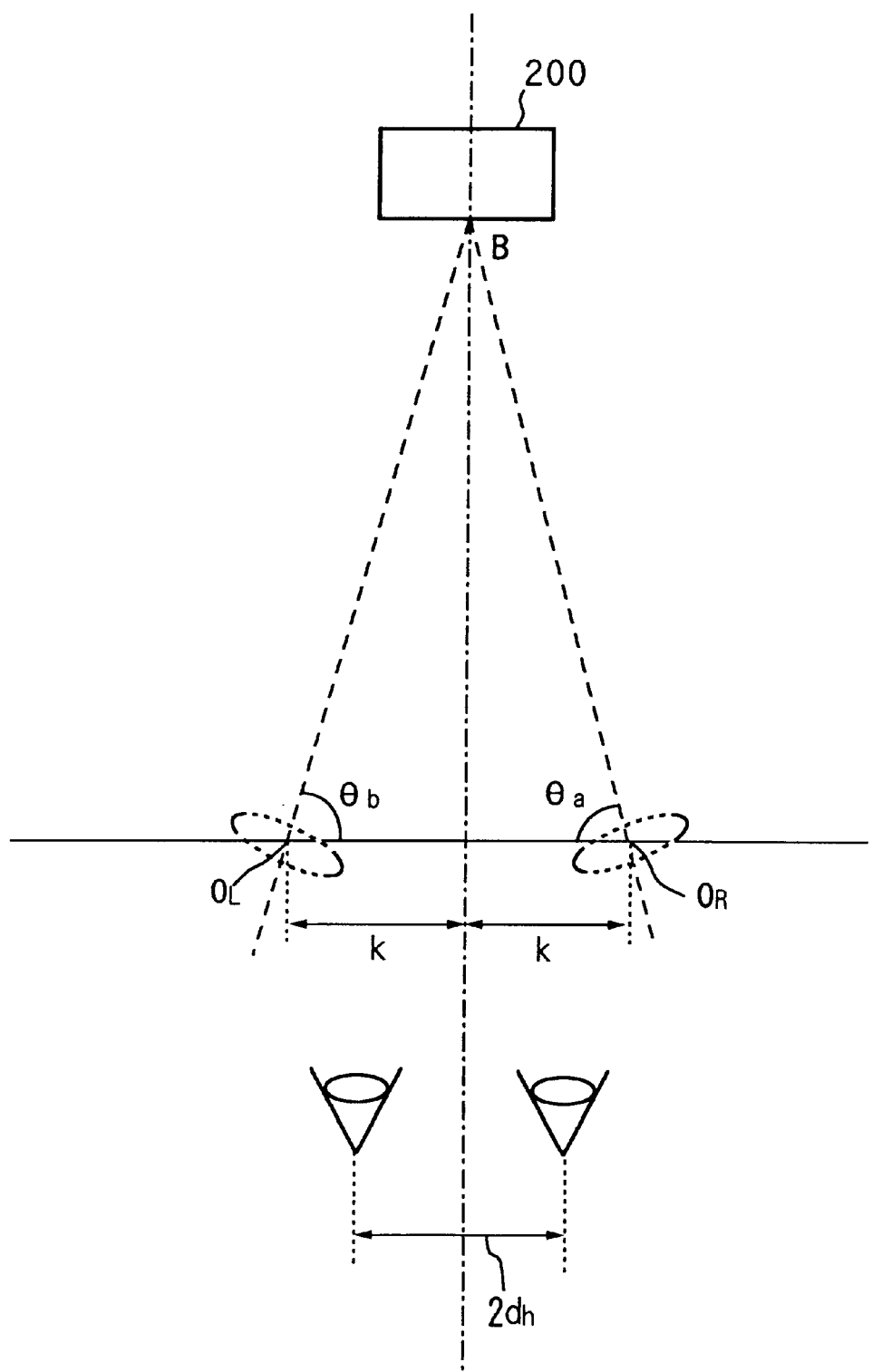
FIG. 2 is an explanatory diagram showing the position of the eyes of an observer relative to an optical system of an image pick-up apparatus of the first embodiment of the present invention.

FIG. 2 shows the positions of the optical systems 101 and 102 relative to a main subject. As shown, let $\theta_b$ represent the convergence angle between the optical systems 101 and 102, and 2k represent the base line distance. As already described, the adjuster 11 adjusts the convergence angle $\theta_b$ and the base line distance 2k, and an adjusted angle is detected by the detector 10, and is then sent to a calculating unit 3 (FIG. 1) to be described later.

An image display 2 includes a right display unit 201 for the right eye, a left display unit 202 for the left eye, a right line-of-sight detector 203, and a left line-of-sight detector 204.

The right display unit 201 and left display unit 202 are identical in specification, and are the so-called retinal display that provides an image through the after image effect by irradiating and scanning the retina with a light beam from a liquid crystal, CRT, LED or laser, each equipped with an observation optical system. In the first embodiment, the display units 201 and 202 respectively scan the left and right retinas by a light beam from an LED circuit 12 to give left and right stereoscopic images to the user.

A right line-of-sight detector 203 and left line-of-sight detector 204 in image display 2 employ the method of detecting the line of sight from the so-called corneal reflection light. To convert the line-of-sight information, determined using the corneal reflection light, into a coordinate system of an image, the image display 2 includes liquid-crystal displays LCD205 and LCD206. This method is disclosed in detail in Japanese Unexamined Patent Publication No. 5-68188, and the discussion of the method is omitted here. The line-of-sight information about the eyeball obtained by the line-of-sight detectors 203 and 204 is sent to the calculating unit 3 to be described later, and serves as a basis for the calculation of the direction vector of the line of sight.

The calculating unit 3 of the image pick-up apparatus calculates an image-pickable range of the stereo camera 1 that assures that the left and right parallax images picked up by the stereo camera 1 causes an image fusion on the user (such a range is hereinafter referred to as "image-fusible range").

The calculating unit 3, substantially realized by computer software, is shown in a functional block diagram in FIG. 1, and comprises a right line-of-sight range calculator 301, a left line-of-sight range calculator 302, a line-of-sight vector calculator 303, a crossing point calculator 307, a distance calculator 305, an image-pickable range calculator 304, and a comparator 306.

The two line-of-sight range calculators 301 and 302 are respectively connected to the right line-of-sight detector 203 and the left line-of-sight detector 204, and calculate the line-of-sight ranges for the left and right eyes of the user based on the outputs from the two detectors 203 and 204. The left and right line-of-sight ranges calculated are input to the line-of-sight vector calculator 303, which calculates the direction vectors of the left and right lines of sight ($d_R$ and $d_L$ to be described later). The crossing point calculator 307 determines the coordinates of the crossing point of the lines of sight, based on the detected direction vectors $d_R$ and $d_L$ of the lines of sight. The distance calculator 305 calculates a distance l from the view point of the user to the subject, based on the detected direction vectors of the lines of sight.

The image-pickable range calculator 304 calculates the image-pickable range (namely, between the distal limit A of the range and the proximal limit B of the range in the direction of depth). The comparator 306 compares the distance l to the subject, calculated by the distance calculator 305, to the limit values A and B, calculated by the image-pickable range calculator 304, to determine whether the subject meets an image fusion condition. Specifically, if the distance to the subject, calculated by the distance calculator 305, meets the following equation, $$B \leq l \leq A$$

the subject is within the image-pickable range, and is determined to meet the image fusion condition.

An image controller 4 controls the units in the image pick-up apparatus. Specifically, the image controller 4 controls right and left camera processors 5 and 6, for the right and left eyes, which converts image signals from CCDs 103 and 104 into a predetermined image format. These processors 5 and 6, under the control of the image controller 4, convert the left and right parallax images picked up by the stereo camera 1 into the predetermined format and store them in an image memory 9.

To present stereoscopic images to the user, the images in the image memory 9 are read and converted into video signals by the image controller 4, and the video signals are then sent to the display units 201 and 202 via drivers 7 and 8, respectively. The image controller 4 exchanges data with the image memory 9. The image controller 4 also sends to the LED circuit 12 a signal that controls the lighting and extinction of an unshown LED installed in the image display 2.

<Operation> . . . First Embodiment

A series of operations of the system are now discussed.

Figure 3:
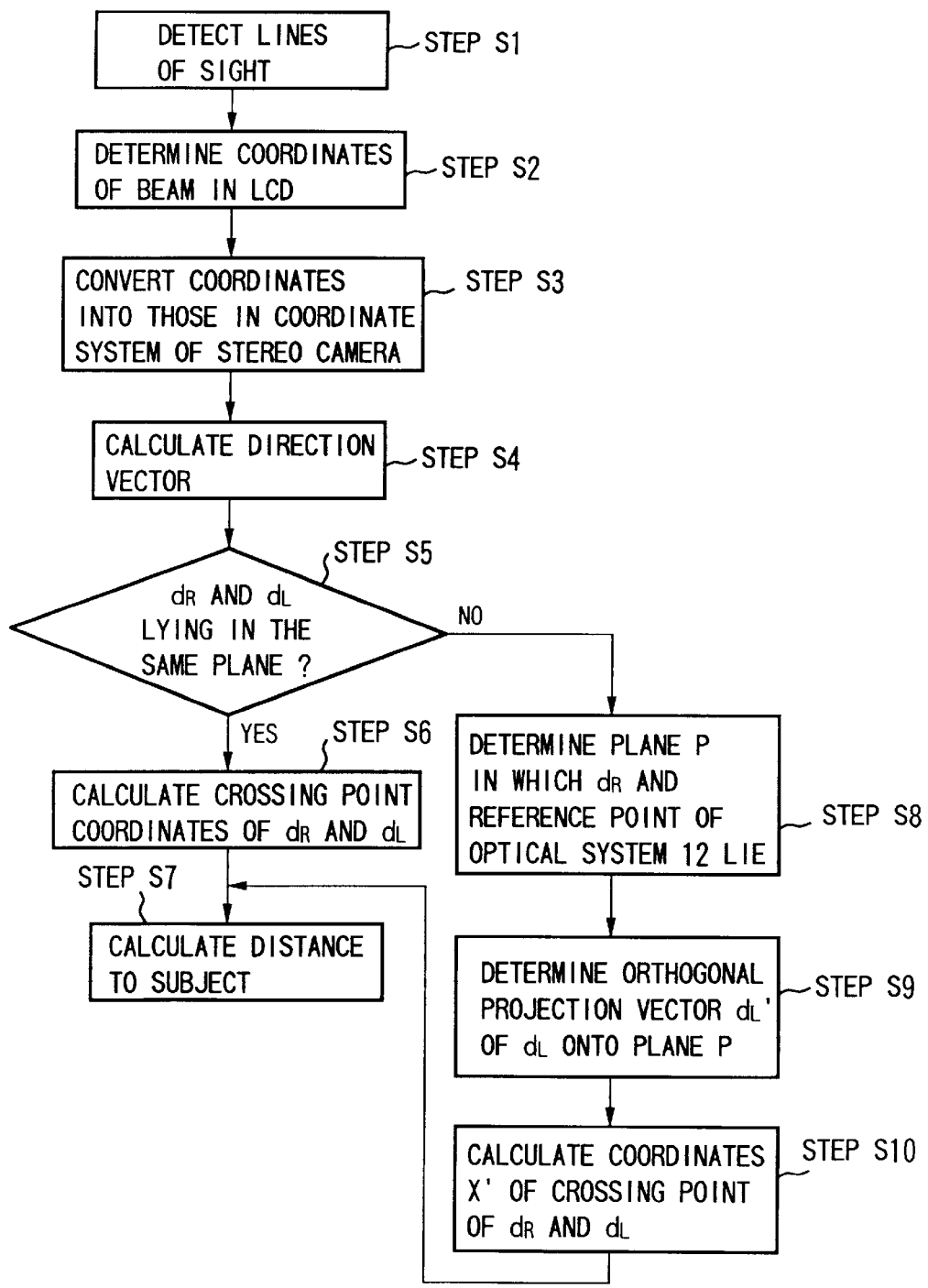
FIG. 3 is a flow diagram showing a control process for measuring a distance to a subject based on the line-of-sight data of the observer in the first embodiment of the present invention.

FIG. 3 shows the operation starting at the line-of-sight detectors 203 and 204 and ending with the calculating unit 3, particularly, to the process for determining the direction vectors of the lines of sight based on the data detected by the line-of-sight detectors 203 and 204.

To detect the image-fusible range in the first embodiment, the subject is picked-up using the stereo camera, and the parallax images in stereoscopic view are presented to the user using the display. Specifically, observing the left and right parallax images presented on the display, the observer indirectly looks at the subject. The image pick-up apparatus then detects the lines of sight of the observer's eyes.

Step S1 corresponds to the line-of-sight detectors 203 and 204 shown in FIG. 1, steps S2 and S3 correspond to the line-of-sight range detectors 301 and 302 shown in FIG. 1, step S4 corresponds to the line-of-sight vector calculator 303, steps S5, S6, S8, S9 and S10 correspond to the crossing point calculator 307, and step S7 corresponds to the distance calculator 305.

In step S1, the lines of sight, namely, the directions of rotation of the eyeballs are detected, based on the corneal reflection phenomenon. As described above, each of the line-of-sight detectors 203 and 204 has its own LCD and CCD. LCD 205 and LCD 206 irradiate the eyeballs of the observer by infrared light beams having a known pattern. The patterned beams are reflected by the corneas, and are then captured by CCD 207 and CCD 208 as images. Since LCD 205 and LCD 206 are beforehand respectively aligned with CCD 207 and CCD 208 in their respective coordinate systems, the pixel positions on CCD 207 and CCD 208 are considered to correspond to the respective spot positions on LCD 205 and LCD 206. In step S2, the coordinate values of each beam spot in each LCD coordinate system are determined. The coordinate values of the beam spot in each LCD coordinate system represent the angle of rotation of the respective eyeball.

In step S3, the coordinate values of the beam spot in each LCD coordinate system obtained in step S2 are converted into the coordinate values in the coordinate systems of the stereo camera 1 (namely, the coordinate systems of CCD 103 and CCD 104). Step S4 determines direction vectors $d_R$ and $d_L$ of straight lines that connect the coordinates of the left beat spot and right beam spot, expressed in the coordinate systems of the stereo camera 1, to reference points of the optical systems 101 and 102. The direction vectors are lines of sight expressed in the world coordinate system. The line of sight expressed in the world coordinate system is hereinafter referred to as "line-of-sight vector" or simply "direction vector".

The right direction vector $d_R$ and left direction vector $d_L$ are not necessarily present in the same plane. It is thus determined in step S5 whether the right direction vector $d_R$ and left direction vector $d_L$ are present the same plane. When it is determined that the two vectors are present in the same plane, the controller 4 goes to step S6 to calculate the crossing point (designated X) of the right direction vector $d_R$ and left direction vector $d_L$ in the world coordinate system.

Figure 4:
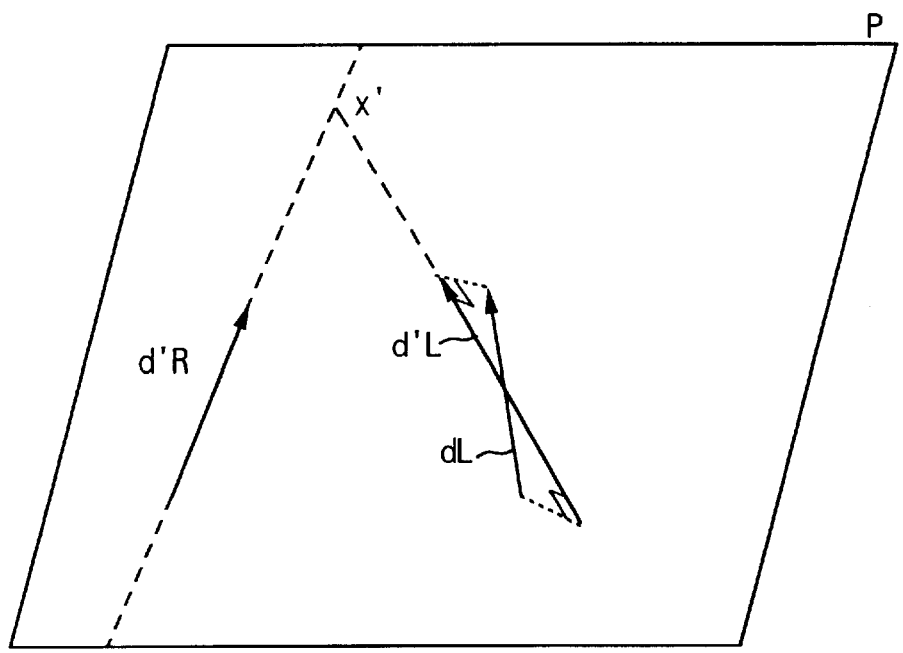
FIG. 4 is an explanatory diagram showing the operation executed in step S8 through step S10 in the control process shown in FIG. 3.

When the two vectors are not present in the same plane, the controller 4 goes to step S8, where plane P in which the right direction vector $d_R$ and the reference point of the right optical system 101 lie is determined as shown in FIG. 4. In step S9, an orthogonal projection vector $d_L{}'$ of the left direction vector $d_L$ with respect to the plane P is determined. In step S10, the coordinates of the crossing point (designated X') of the right direction vector $d_R$ and the left direction vector $d_L{}'$ is calculated in the world coordinate system. Step S7 determines the distance l between the predetermined reference point of the stereo camera 1 (the center point between the reference point of the right optical system 101 and the reference point of the left optical system 102) and the crossing point determined in either step S6 or step S10 (X or X').

Discussed next is the calculation of the range l of the distance to the subject satisfying the image fusion condition, namely, the image-pickable range of distance to the subject.

A range within which humans can fuse left and right parallax images presented on display screens as a stereoscopic image (an image-fusible range) is different depending on the distal side (beyond the display screens) or on the proximal side (on this side of the display screens). The image-fusible range depends on the characteristics of the human eyes. Considering that the inter-pupillary distance of the human is about 65 mm wide, and that the distance of distinct vision of the human is about 200 mm, this system determines a distal limit A based on the human inter-pupillary distance (about 65 mm) and a proximal limit C based on the distance of distinct vision.

Figure 5:
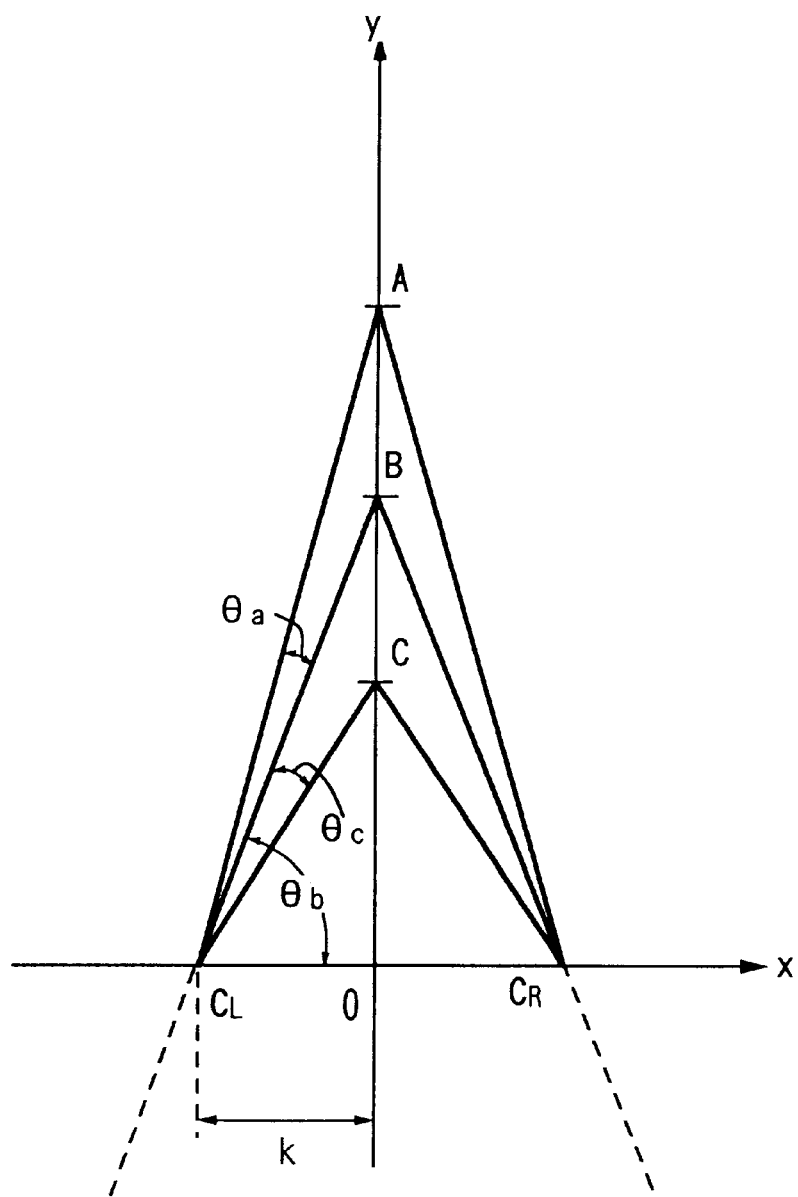
FIG. 5 is an explanatory diagram illustrating the principle of determining an image-fusible range.

Referring to FIG. 5, the image-fusible range is discussed.

As shown, the y axis represents the direction of depth, and the z axis represents the vertical direction of the apparatus. The x axis is perpendicular to the direction of depth. FIG. 5 is drawn at a constant in the z axis.

Referring to FIG. 5, there are shown a reference point $O_L$ of the left optical system 102 (the lens center when the optical system is considered as a single thin lens) and a reference point $O_R$ of the right optical system 101 (the lens center when the optical system is considered as a single thin lens). When the optical systems 101 and 102 are set up, the reference points $O_L$ and $O_R$ are fixed points, and the crossing point B of the optical axes of the optical systems 101 and 102 also becomes fixed.

Let A represent a distal limit point of the image-fusible range with respect to the point B and let C represent a proximal limit point of the image-fusible range with respect to the point B. The point B then coincides with the center of the image screen of the left and right optical systems 102 and 101. Since the point B has zero parallax, the point B appears as a point on the display screen to the observer looking at the stereoscopic image displayed. To the same observer, the point A appears as point present beyond the display screen and the point C appears as a point on this side of the display screen.

With the origin of the x-y coordinates positioned at the center of the base line distance between the points $O_L$ and $O_R{}'$ these points are $A(0,A)$, $B(0,B)$, $C(0,C)$, $O_L(-k,0)$, and $O_R(k,0)$. Furthermore, $\theta_b$, $\theta_a$, and $\theta_c$ represent the following angles.

$$\angle BO_L O = \angle BO_R O = \theta_b$$

$$\angle BO_L A = \angle BO_R A = \theta_a$$

$$\angle BO_L C = \angle BO_R C = \theta_c$$

Figure 6:
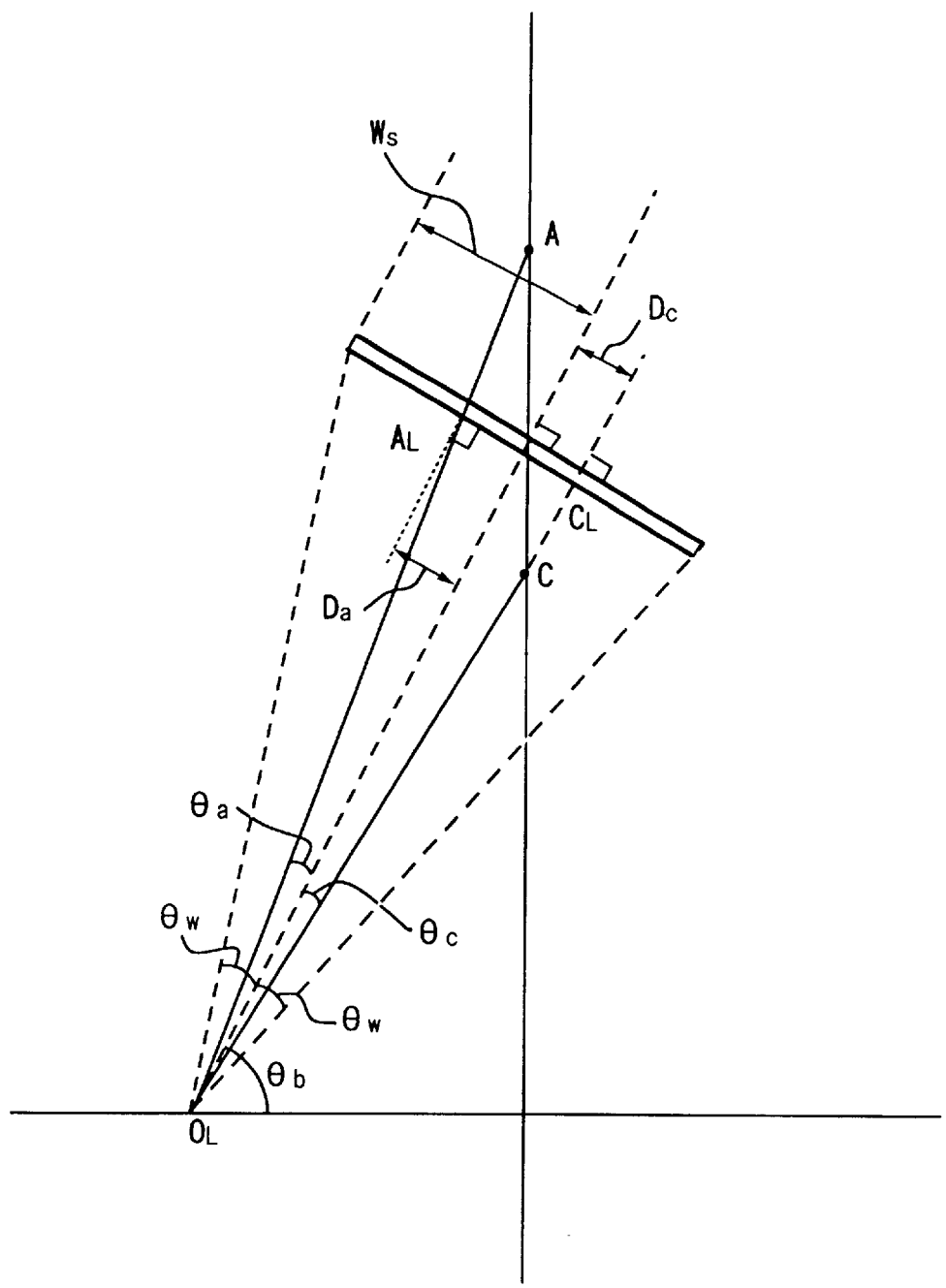
FIG. 6 is an explanatory diagram illustrating the principle of determining the farthest position of the image-fusible range.

Since the point B is the crossing point of the optical axes of the two optical systems 101 and 102 as already described, it is possible to make an image pick-up plane coincide with a plane which is perpendicular to each optical axis and in which the point B lies. Referring to FIG. 6, a virtual image pick-up plane of the left optical system 102 is set up to be aligned on the point B. The distal point A and the proximal point C respectively become a point $A_L$ and a point $C_L$ on the virtual image pick-up plane.

Let $2\theta_W$ represent the lens view angle of each of the optical systems 101 and 102. The display units 201 and 202 presenting the parallax images each have a horizontal width of $2W_S$, and are positioned in front of the observer with a predetermined distance $d_S$ allowed therebetween. In this setup, the length of the virtual image pick-up plane shown in FIG. 6 is preferably equal to the horizontal dimension of each of the display units 201 and 202. With this arrangement, the size of the virtual image pick-up plane is $2W_S$. As shown in FIG. 6, the points A and C are present within an angle range of $2\theta_W$.

Referring to FIG. 6, the left eye of the observer sees the point A as the point $A_L'$ on the image pick-up plane, though the point A is actually present straight ahead of the observer. The reason why there is a distance $BA_L'$ between the point B and the point $A_L'$ is that the two eyes of human are spaced having a parallax. The distance $BA_L'$ is the quantity that may be called a parallax of the subject, and is expressed in a deviation on the image. Let $D_A$ represent the deviation of the point A and $D_B$ represent the deviation of the point C, and the following equation holds.

$$\frac{D_A}{\tan\theta_a} = \frac{D_C}{\tan\theta_c} = \frac{W_S}{\tan\theta_W}$$

$D_A$ and $D_B$ are thus expressed by the following equations.

$$D_A = W_S \times \frac{\tan\theta_a}{\tan\theta_W} \quad \text{EQ1}$$

$$D_C = W_S \times \frac{\tan\theta_c}{\tan\theta_W} \quad \text{EQ2}$$

In determining the fusion condition in the image pick-up system, the left and right parallax images are obtained by picking up a subject 200 on the stereo camera 1 of FIG. 1 (with its base line distance 2k and convergence angle $\theta_b$) and the parallax images are displayed on the display units 201 and 202 (with their horizontal dimensions of $2W_S$) placed at a position in front of the observer with the predetermined distance $d_S$ allowed. A determination is made of whether the left and right parallax images are displayed in a fused state to the eyes of the observer. Specifically, the determination is made depending on whether the distance l from the stereo camera 1 to the subject satisfies the above parameters (namely, the fusion condition, to be described later, determined by the base line distance of 2k, the convergence angle of $\theta_b$, the distance $d_S$ to the display units and the size $2W_S$ of the display units).

Let $2d_h$ represent the inter-pupillary distance of the observer, and as can be seen from FIG. 6, when the deviation of the point A, namely, the distance $BA_L'$ (=$2D_A$) is smaller than $2d_h$, in other words, $2D_A \leq 2d_h$, the subject on this side of the point A must be fused. The following equation thus holds.

$$d_h \geq D_A \ldots \quad \text{EQ3}$$

where $$\tan(\theta_a + \theta_b) = \frac{A}{k} \quad \text{EQ4}$$

$$\tan\theta_b = \frac{B}{k} \quad \text{EQ5}$$

The following equation is derived from EQ1, EQ3 through EQ5.

$$A \leq k \times \frac{d_h \cdot \tan\theta_W + W_S \cdot \tan\theta_b}{W_S - d_h \cdot \tan\theta_b \cdot \tan\theta_W} \quad \text{EQ6}$$

The right side of EQ 6 signifies the image-fusible range beyond the screen with the point B aligned with the center of the screen. Specifically, if the subject 200 is beyond the point B but on this side of the point A defined by the following equation, the subject 200 is within the fusible range.

$$k \times \frac{d_h \cdot \tan\theta_W + W_S \cdot \tan\theta_b}{W_S - d_h \cdot \tan\theta_b \cdot \tan\theta_W}$$

As already described, k and $\theta_b$ are obtained by the convergence angle/base line distance detector 10. $\theta_W$ is a value known from lens data, and $W_S$ is also a known value in display condition. In this embodiment, $d_h$ is a predetermined value (65 mm/2 =32.5 mm). However, the value of $d_h$ is not limited to this.

Figure 7:
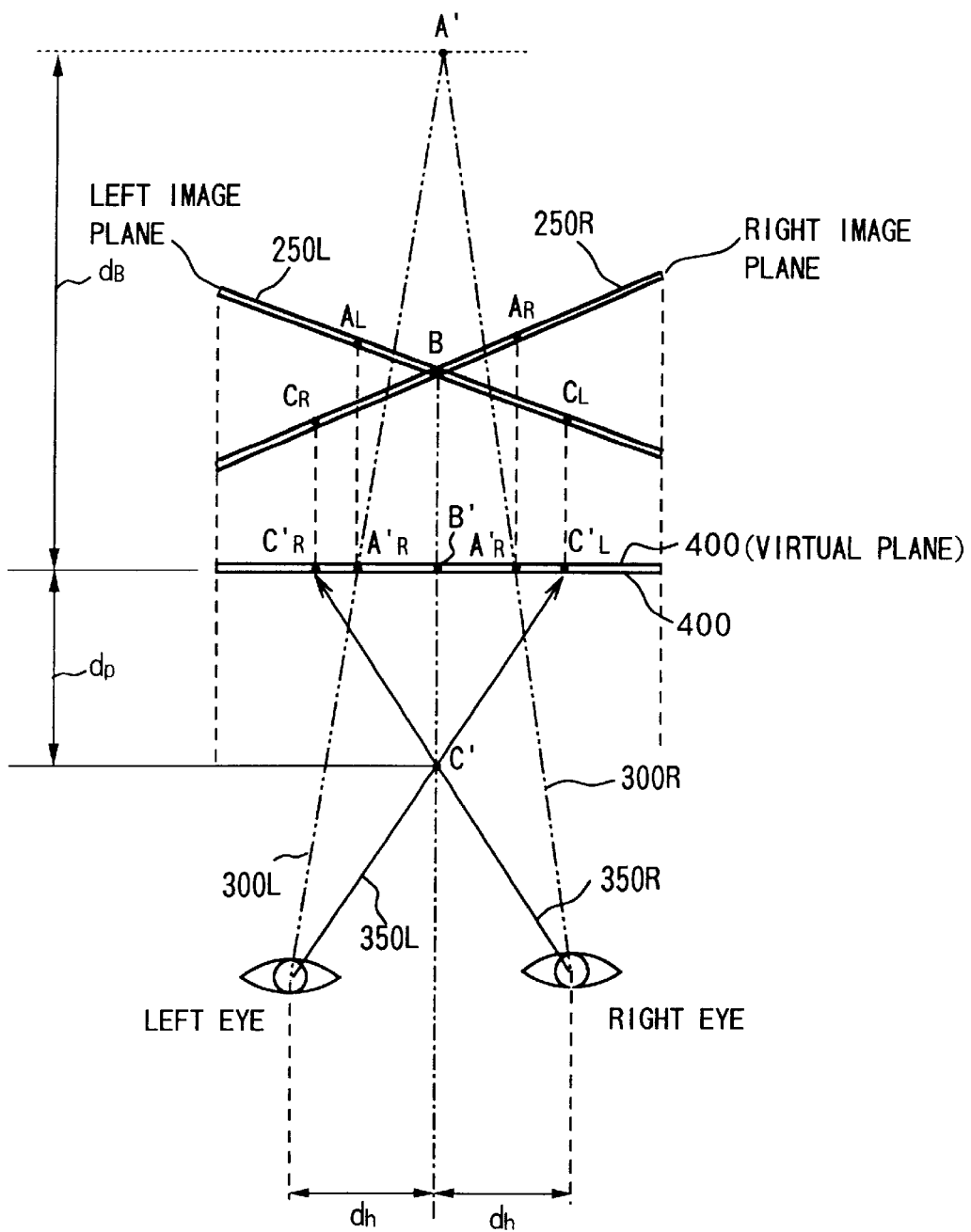
FIG. 7 is an explanatory diagram illustrating the principle of determining the nearest position of the image-fusible range.

Referring to FIG. 7, the point C is now considered.

FIG. 7 shows not only the virtual image pick-up plane 250L but also the virtual image pick-up plane 250R. Specifically, images $A_L$ and $C_L'$ corresponding to the points A and C, are obtained in the right image pick-up plane 250L, and images $A_R$ and $C_R$, corresponding to the points A and C, are obtained in the left image pick-up plane 250R. If the observer looks at the image pick-up plane with both eyes, the left and right fields of view are combined on a single virtual plane 400. On the virtual plane 400, points $A_L'$ and $A_R'$ are formed for the point A, and points $B_L'$ and $B_R'$ are formed for the point B. To the observer, the point A appears to be present at a crossing point A' where a straight line 300L connecting the left eye to the point $A_L'$ intersects a straight line 300R connecting the right eye to the point $A_R'$. And the point C appears to be present at a crossing point C' where a straight line 350L connecting the left eye to the point $C_L'$ intersects a straight line 350R connecting the right eye to the point $C_R'$. In other words, the point A appears to stand back by a distance $d_B$, and the point C appears to be projected by a distance $d_p$ as shown in FIG. 7.

Figure 8:
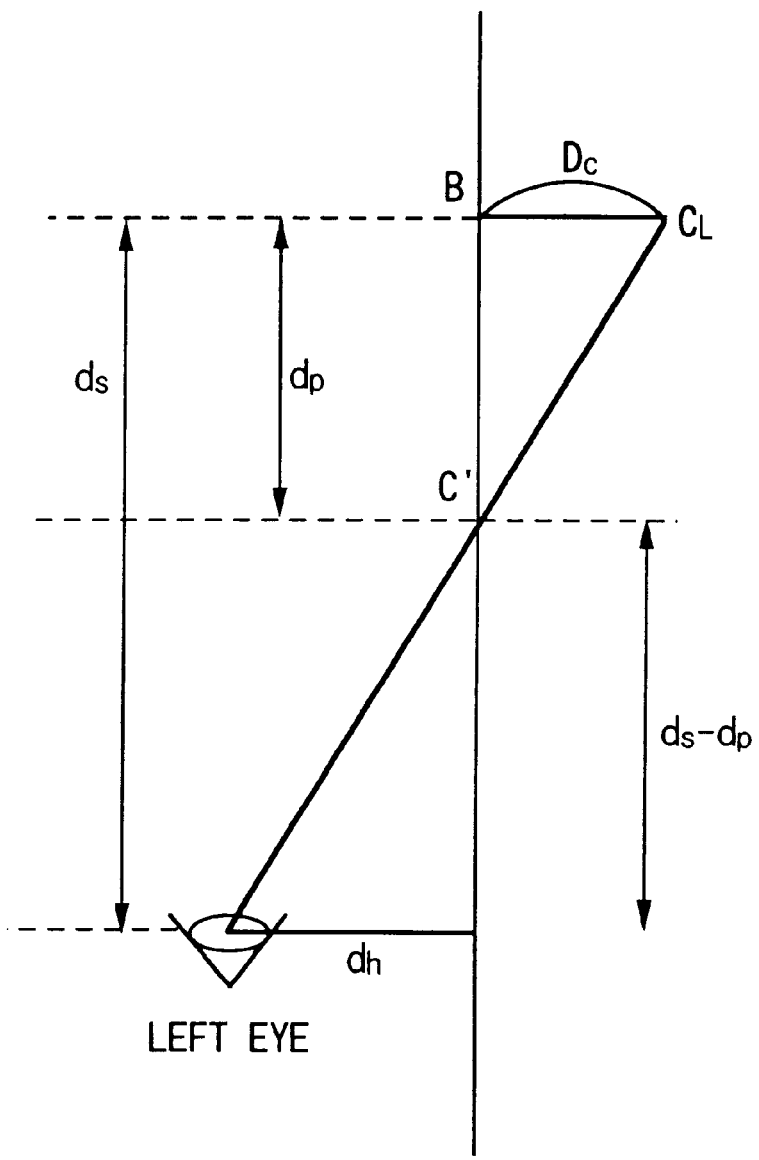
FIG. 8 is an explanatory diagram illustrating the principle of determining the nearest position of the image-fusible range.

FIG. 8 shows the relationship of the projection distance $d_P$, the distance $d_S$ to the display unit and the deviation $D_C$. As can be seen from FIG. 8, the following equation holds.

$$\frac{D_C}{d_p} = \frac{d_h}{(d_S - d_p)} \quad \text{EQ7}$$

From EQ7, $$D_C = \frac{d_p \cdot d_h}{d_S - d_p} \quad \text{EQ8}$$

Since the following equation holds, $$\tan\theta_C = \frac{k \cdot (B-C)}{k^2 + B \times C} \quad \text{EQ9}$$

$$C = \{d_P \cdot W_S \cdot \tan\theta_b - d_h \cdot (d_S - d_P) \cdot \tan\theta_W\} \times \{d_P \cdot W_S + \tan\theta_b \cdot d_h \cdot (d_S - d_P) \cdot \tan\theta_W\} \quad \text{EQ10}$$

The right side of EQ10 signifies the proximal limit value of the image-fusible range with the screen center aligned with the point B. Specifically, the image-fusible range on this side of the point B is beyond the point C.

k and $\theta_b$ are obtained by the convergence angle/base line distance detector 10. $\theta_W$ is a value known from lens data, and $W_S$ and $d_S$ are values known from the display condition. In this embodiment, $d_h$ and $d_S$ are predetermined values ($d_h$=65 mm, $d_P$=200 mm), though the present invention is not limited to these values.

From the above discussion, the distance 1 to the subject 200 that satisfies the fusion condition is expressed by the following equation.

$$k \times \frac{d_h \cdot \tan\theta_W + W_S \cdot \tan\theta_b}{W_S - d_h \cdot \tan\theta_b \cdot \tan\theta_W} \leq l \leq \quad \text{EQ11}$$

$$\{d_p \cdot W_S \cdot \tan\theta_b - d_h \cdot (d_S - d_p) \cdot \tan\theta_W\} \times$$

$$\{d_p \cdot W_S + \tan\theta_b \cdot d_h \cdot (d_S - d_p) \cdot \tan\theta_W\}$$

The principle of the determination of whether the subject meets the fusion condition in the image pick-up system has been discussed.

The image pick-up system has a function of determining whether the subject being captured meets the fusion condition, namely, falls within the image-pickable range ($C \leq l \leq A$), and informing the user of the determination result.

Figure 9:
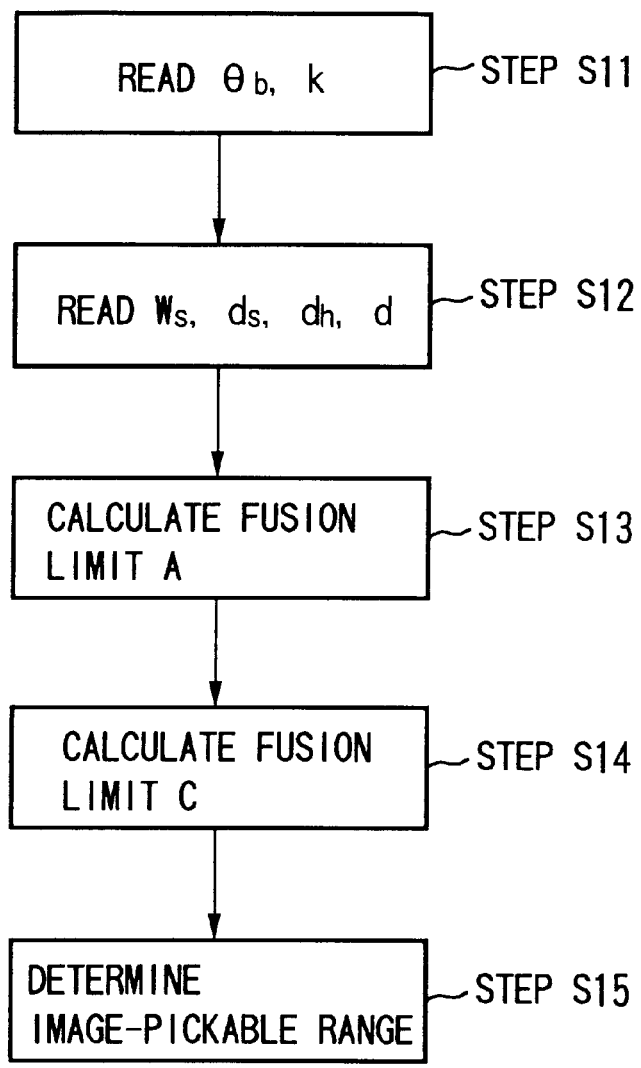
FIG. 9 is a flow diagram showing the control process for determining the image-fusible range.

FIG. 9 is a flow diagram showing the control process that incorporates the user informing function.

In step S11, the convergence angle $\theta_b$ and the base line distance 2k, set by the user, are read into the optical systems 101 and 102. In step S12, the known size $W_S$ of the image pick-up apparatus, the distance $d_S$ to the display units, the inter-pupillary distance $d_h$, and the projection distance $d_P$ are also read.

In step S13, the distal fusion limit point A is determined according to EQ6. In step S14, the proximal fusion limit point C is determined according to EQ10. In step S15, the image-pickable range is determined.

The comparator 306 compares the distance to the subject which the user looks at, calculated by the distance calculator 305, namely, the distance 1 to the subject which the user is now image-picking up, with the distal fusion limit point A and the proximal fusion limit point C. The comparator 306 then compares the distance to the object of the view point determined in step S11 with the image-pickable range determined in step S15. Specifically, the comparator 306 determines whether the object of the view point falls within or out of the image-pickable range. The comparison result is sent to the image controller 4. Either the display unit 201 or display unit 202 or both are provided with LEDs (not shown), and the display units 201 and 202 light or flash the LEDs to indicate whether the subject is within or out of the range. The LEDs may be lit to indicate that the subject is out of the range and may be extinguished to indicate that the subject is within the range. Alternatively, the LEDs may be flashed to indicate that the subject is out of the range and may be extinguished to indicate that the subject is within the range. The image display 2 may present the result of the above determination.

As described above, when image-picking up, the user easily knows whether the main subject is within the image-fusible range (image-pickable range).

Since the user easily knows, when image-capturing, whether the main subject is within the image-fusible range according to the first embodiment, the user picks up a stereoscopic image easy to see and imposing less fatigue.

<Modification of the First Embodiment>

The present invention is not limited to the first embodiment, and a diversity of modifications of the first embodiment are contemplated.

In the first embodiment, the observer looks at the image of the subject displayed on the display units and the lines of sight of the observer are then detected. The present invention also works to detect the lines of sight of the observer (user) who directly looks at the subject. This is because the distance 1 to the subject is also determined from the lines of sight of the user who directly looks at the subject.

No particular optical specifications are set for the optical system 101 and CCD 103. Any systems are perfectly acceptable as long as the optical system 101 and CCD 103 in pairs are respectively identical, in optical specification, to the optical system 102 and CCD 104 in pairs.

In the first embodiment, image picking is performed in a cross method in which the camera optical axes cross each other. According to the present invention, image picking is performed in a parallel method in which the camera optical axes run in parallel.

The line-of-sight detection of the present invention is not limited to the method in which the angle of rotation of the eyeball is detected. Alternatively, any other method may be used, including the EPG method for making use of a voltage difference between the voltages of the eyeballs, the method of using a difference in reflectance between the white and the pupil in the sclera of the eye, and the search coil method in which a coil-embedded contact lens is put on under the presence of a magnetic field to measure the movement of the eyeballs.

The image display 2 in the first embodiment is a fixed type. The present invention also works in any other appropriate display means such as a head-mounted display (HMD).

The medium of the image memory 9 in the first embodiment is a magnetic tape. The present invention is not limited to this. Alternatively, the image memory 9 may be an IC memory, a magneto-optical disc, a DVD disc, a compact disc, or a PD disc.

<Second Embodiment>

The present invention permits the left and right parallax images to be picked up through a single lens set, without requiring two lens sets. The present invention thus implements compact and low-cost design in the apparatus, eliminates the characteristic difference between the left and right lenses, and picks up a high-quality stereoscopic image with the simple construction. By arranging mirrors and liquid crystals symmetrically with respect to the lens optical axis, the optical path lengths of the left and right parallax images to the subject are equalized. With this arrangement, the image pick-up apparatus is thus free from a magnification difference between the left and right images, presenting a high-quality stereoscopic image. Since the left and right parallax images are picked up by a single pick-up device in the image pick-up system, no extra electronic circuit is required. Compact and low-cost design is thus implemented in the image pick-up apparatus. As one of an interchangeable lens system, the lens of the system may be used, and the camera section needs no particular modification in order to pick up a stereoscopic image. An ordinary two-dimensional lens may be used in the same camera. This arrangement provides expandability and increases the merit of the camera. A plurality of lenses, including the lens for stereoscopic image picking and lenses of different specifications, for example, different focal lengths, may be commonly used on the same camera.

Since automating the convergence control reduces the load imposed on the user during image-capturing, the user is enabled to capture a high-quality stereoscopic I: image with less fatigue involved.

Figure 10:
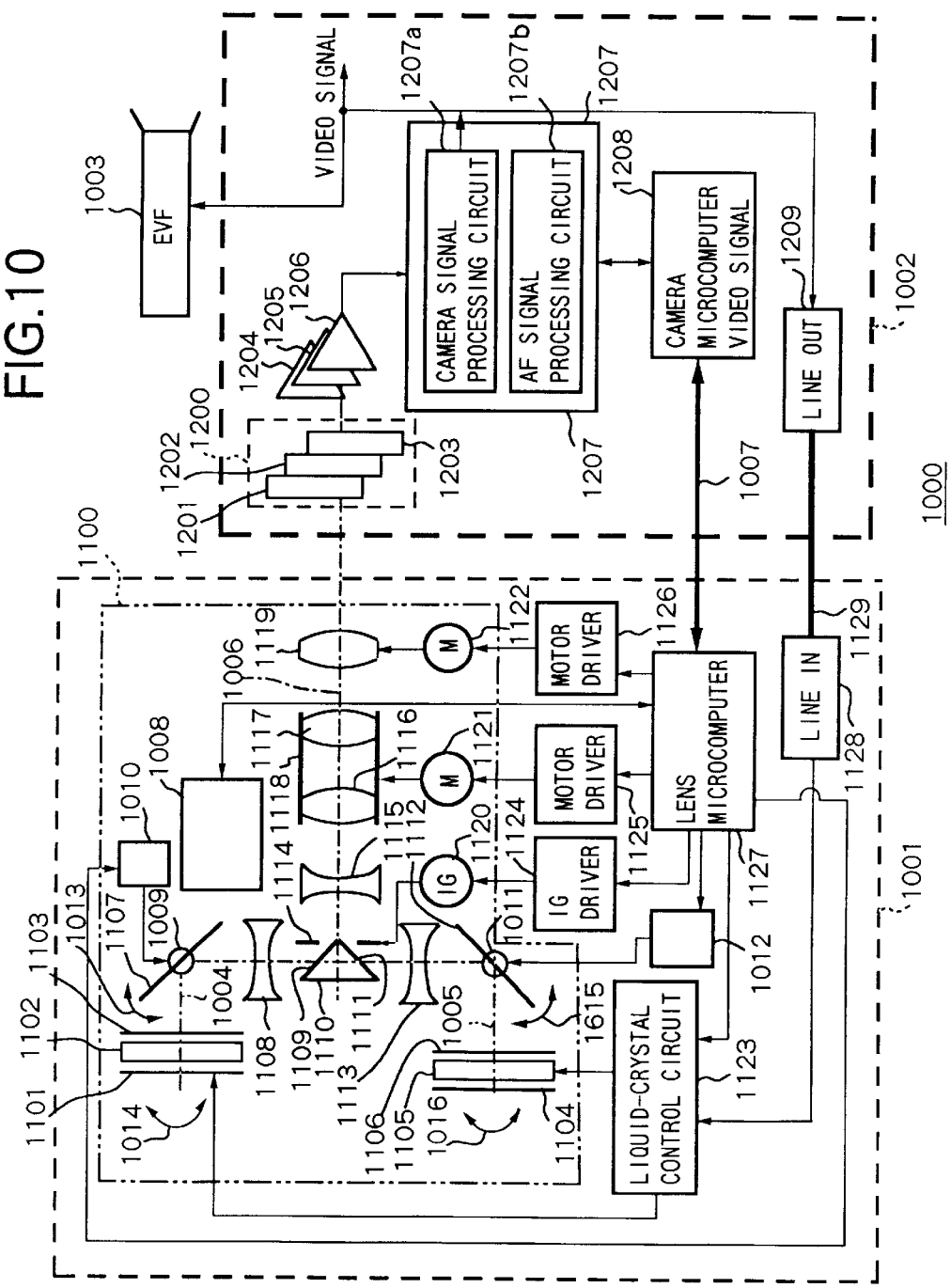
FIG. 10 is a block diagram of an image pick-up apparatus according to a second embodiment of the present invention.

FIG. 10 shows the basic construction of a second embodiment of a stereoscopic image pick-up apparatus 1000.

The stereoscopic image pick-up apparatus 1000 includes a lens unit 1001 and a main unit 1002.

The interchangeable lens unit 1001 is the one that is standardized according to a predetermined format, and includes an image pick-up optical system 1100, a liquid-crystal control circuit 1123, an IG driver 1124, motor drivers 1125 and 1126, a lens microcomputer 1127 for controlling these units, and an image input terminal 1128 and a lens mount (not shown) and a contact block (not shown), both standardized according to a predetermined format.

The main unit 1002 includes the unshown camera mount and the contact block, which are standardized according to the predetermined format. The lens mount of the lens unit 1001 is mechanically coupled with the camera mount in a detachable manner. When the lens mount is attached onto the camera mount, the contact block of the lens unit 1001 and the contact block of the main unit 1002 is mated with each other with the contacts of the two contact blocks connected. The operation represented by an arrow 1007, namely, data communications between the lens microcomputer 1127 and a camera microcomputer 1208 are performed by a predetermined protocol. The power supplying from the camera to the lens side is carried out through the respective contact blocks of the camera and lens sides.

The image pick-up optical system 1100 is driven by drive units 1009 and 1011, and have total reflection mirrors 1107 and 1112, both pivotally supported about respective predetermined axes.

The drive units 1009 and 1011 employ stepping motors in this embodiment. Alternatively, DC motors or ultrasonic motors may be used.

Receiving a control signal from the lens microcomputer 1127, drivers 1010 and 1012 feed drive signals to the stepping motors 1009 and 1011. The lens microcomputer 1127 counts the number of steps of the stepping motors 1009 and 1011 to detect the angle of rotation of each stepping motor. The drivers 1010 and 1012 may be provided with encoders to detect the angles of pivot of the mirrors when the DC motors or ultrasonic motors are employed. The angles of pivot of the mirrors are thus detected. With the stepping motors 1009 and 1010 driven, the mirrors 1107 and 1112 are pivoted about their respective predetermined axes to variably change the directions of optical axes 1004 and 1005.

In the second embodiment, the mirror 1107 (1112) turns about a straight line as the axis of pivot, which passes in the vicinity of the intersection of the optical axis 1004 (1005) and the mirror 1107 (1112), and is aligned perpendicular to the page of FIG. 10, namely, aligned in the vertical direction of the screen. The optical axes 1004 and 1005 of the left and right images generally lie in the same plane, and intersect (or converge) at any predetermined position including infinity.

As described above, the mirrors 1107 and 1112 are pivoted about the respective predetermined axes to change the converged position of the optical axes. Making the convergence variable is essentially important to pick up a natural-looking image. The spacing between the intersection of the optical axis 1004 and the reflective surface of the mirror 1107 and the intersection of the optical axis 1005 and the reflective surface of the mirror 1112 (hereinafter referred to a "base line distance") is about 63 mm in the second embodiment, though the present invention is not limited to this value. To pick up a natural-looking stereoscopic image, the base line distance is set to be equal to the average inter-pupillary distance of humans, namely, 63 mm.

A subject distance measuring unit 1008 measures a distance to the subject using a triangulation method.

Figure 11:
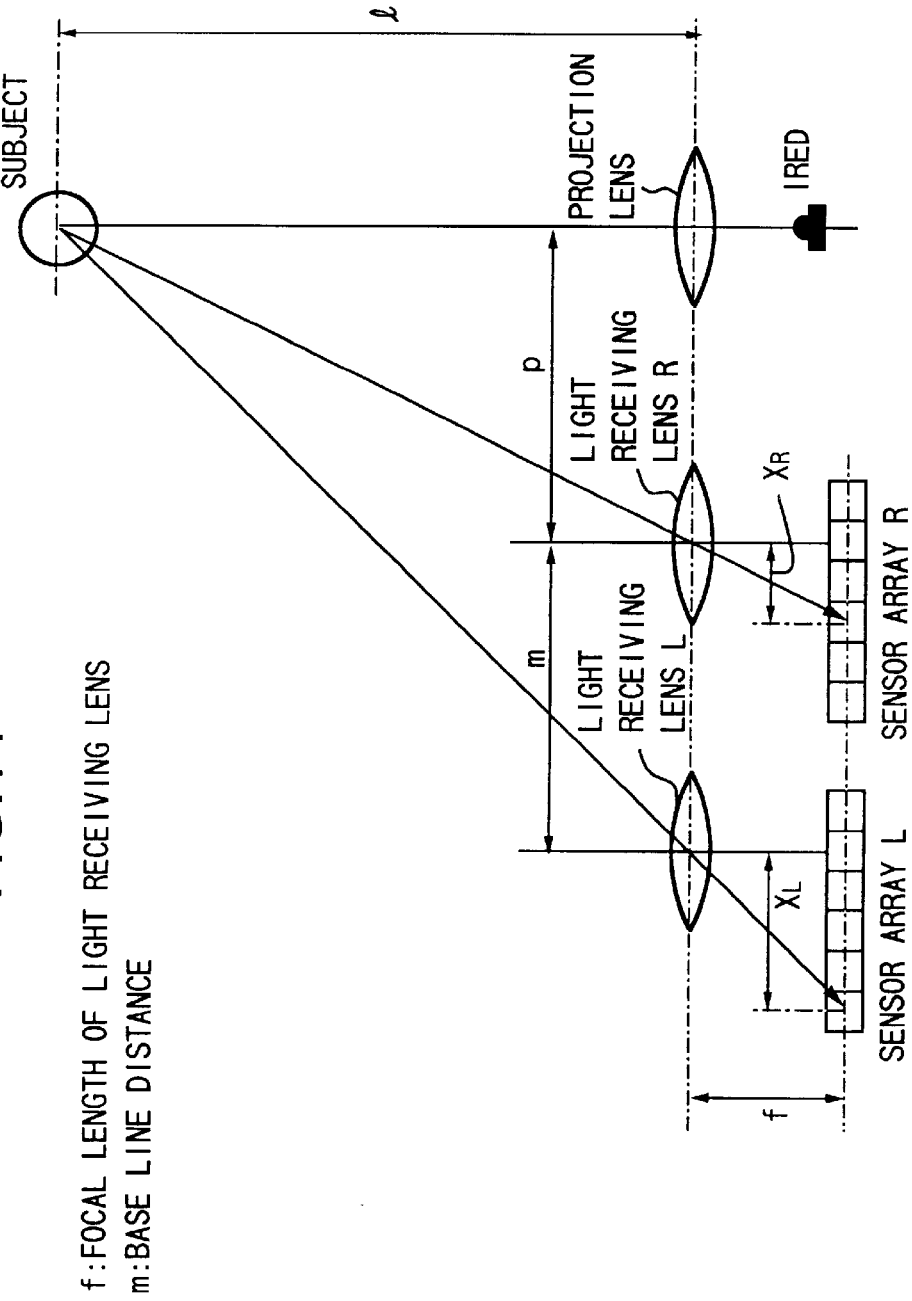
FIG. 11 is an explanatory diagram showing a distance measurement method (triangulation) employed in the second embodiment of the present invention.

FIG. 11 illustrates the principle of distance measurement using the triangulation.

The subject distance measuring unit 1008 includes a projection lens and light receiving lenses, an infrared LED (IRED) of light emitting means, line sensors, each having a plurality of photocells of light receiving means arranged in a line, and calculator means for calculating the distance l to the subject in response to the output of the line sensors. The light ray emitted from IRED is reflected from the subject, and is then received by the left light receiving lens L and the right light receiving lens R, and is then focused on the left line sensor L and right line sensor R. It is now determined which of the photocells receives the light ray. Suppose that the photocell $X_L$ of the sensor L receives the light ray and that the photocell $X_R$ of the sensor R receives the light ray. By determining the difference ($X_L$-$X_R$), the subject distance l is determined based on the focal length f of the light receiving lenses L and R and the spacing m between the light receiving lenses L and R.

The subject distance information is calculated using the triangulation in this embodiment. It is also possible to derive the subject distance information from the position information of lenses.

The image pick-up apparatus in the first embodiment employs two separate, left and right optical systems, while the image pick-up apparatus in the second embodiment has a common portion. The optical system of the second embodiment is now discussed.

The optical system of the second embodiment includes a set of lenses 1108, 1113, and 1115, each constructed of a single or a plurality of elements and having a negative refractive power, a lens set of lenses 1116, 1117, and 1119, each constructed of a single or a plurality of elements and having a positive refractive power, a prism 1110 with its surfaces 1109 and 1111 featuring total reflection, polarizers 1101, 1103, 1104 and 1106, and liquid-crystal elements 1102 and 1105. On the left optical path, the polarizers 1101 and 1103 and liquid-crystal element 1102 are combined. The electric field applied on the liquid crystal is controlled to transmit or not to transmit a luminous flux through the liquid crystal. The same is true of the combination of the polarizers 1104 and 1106 and liquid-crystal element 1105. In other words, the liquid-crystal elements 1102 and 1105 serve as liquid-crystal shutters in their respective optical paths.

In the second embodiment, the liquid-crystal element employs FLC (ferroelectric liquid crystal). The present invention is not limited this. Alternatively, TN (twisted nematic liquid crystal) or STN (super twisted nematic liquid crystal) may be employed. The polarizers 1101 and 1103, and the polarizers 1104 and 1106 may be respectively glued onto the liquid crystals 1102 and 1105 using an adhesive agent, or may be supported on their own.

An aperture 1114 serves as an light quantity adjuster. In the second embodiment, the aperture 1114 is arranged in front of the lens set to its side facing an object so that the effective diameter of a fore-element is reduced.

An IG meter 1120 controls the opening of the aperture 1114.

Step motors 1121 and 1122 move respective lenses. The lens set 1108, 1113 and 1115 is fixed. The lens 1116 is a variator, the lens 1117 is a compensator, the lens 1119 has the focusing function, and all these lenses are movable. In the second embodiment, the variator lens 1116 and the compensator lens 1117 are mechanically interlocked with a barrel 1118 with a cam and are supported in such a manner that allows the variator lens 1116 and the compensator lens 1117 to be moved in the direction of optical axis. With the cam barrel 1118 rotated by the stepping motor 1121, zooming is performed. The driving method is not limited to this. The lenses 1116 and 1117 may be separately driven by separate drive means without using the cam barrel. The stepping motor 1122 drives the lens 1119. Instead of the stepping motors, electromagnetic motors such as DC motors, ultrasonic motors, and electrostatic motors may be used.

The positions of the lenses 1116, 1117 and 1119 in the direction of optical axis are detected by counting drive pulses of the stepping motors that drive these lenses and converting them into the positions of the lenses. The present invention is not limited to this position detection means. Alternatively, a variable resistor method, an electrostatic capacity method, or an optical method with PSD or IRED may be used.

The IG meter 1120 adjusts the light quantity by driving the aperture 1114.

An unshown ND filter is arranged in the lens unit 1001. A rear-focus zoom type is used here. Specifically, during zooming, the lens microcomputer 1127 drives lenses 1116, 1117 and 1119 to move them in a predetermined relationship. The present invention is not limited to this zoom type.

The main unit 1002 includes image pick-up elements 1201, 1202, and 1203 in a three-plate image pick-up unit 1200, amplifiers 1204, 1205, and 1206 respectively connected to the image pick-up elements 1201, 1202, and 1203, a signal processing circuit 1207 connected to each of the amplifiers 1204, 1205, and 1206, the camera microcomputer 1208 connected to the signal processing circuit 1207, unshown zoom switch and AF switch, both connected to the camera microcomputer 1208, an image output terminal 1209, and an electronic view finder (hereinafter referred to as EVF) 1003.

The signal processing circuit 1207 includes a camera signal processing circuit 1207a and an AF signal processing circuit 1207b. The output of the camera signal processing circuit 1207a is output as a video signal, and the output of the camera microcomputer 1208 is output to the lens microcomputer 1127 in the lens unit 1001.

The three-plate image pick-up unit 1200 separates an incident light ray picked up by the image pick-up optical system 1100 into the three primary colors, through a first prism through a third prism 1201, 1202, and 1203 (hereinafter referred to as color separation prisms). The red component of the three primary colors is focused on the image pick-up element 1201, the green component is focused on the image pick-up element 1202, and the blue component is focused on the image pick-up element 1203. The images of the subject formed on the image pick-up elements 1201, 1202, and 1203, are photoelectrically converted into electric signals, which are then respectively fed to the amplifiers 1204, 1205, and 1206. The electric signals are amplified by the respective amplifiers 1204, 1205, and 1206 to their proper levels, and are then converted by the camera signal processing circuit 1207a into a standard television signal to be output as the video signal. The electric signals are also fed to the AF signal processing circuit 1207b. The AF signal processing circuit 1207b generates an AF assessment value signal using the three primary color signals from the amplifiers 1204, 1205, and 1206. Under the control of a pre-stored data reading program, the camera microcomputer 1208 reads the AF assessment value signal generated in the AF signal processing circuit 1207b and transfers it to the lens microcomputer 1127. The lens microcomputer 1127 drives the lens 1119 for focus control, based on the incoming AF assessment value signal.

The driving of the lens system has been discussed.

The discussion that follows details how a pair of parallax images are captured through the optical systems having the common portion with synchronization therebetween assured.

The image pick-up operation of the three-plate image pick-up unit 1200 for picking up the left and right parallax images is discussed first.

The image output terminal 1209 of the main unit 1002 is connected to the image input terminal 1128 of the lens unit 1001 via a cable 1129, and the image signal picked up in the main unit is fed to the liquid-crystal control circuit 1123 of the lens unit side.

Figure 12:
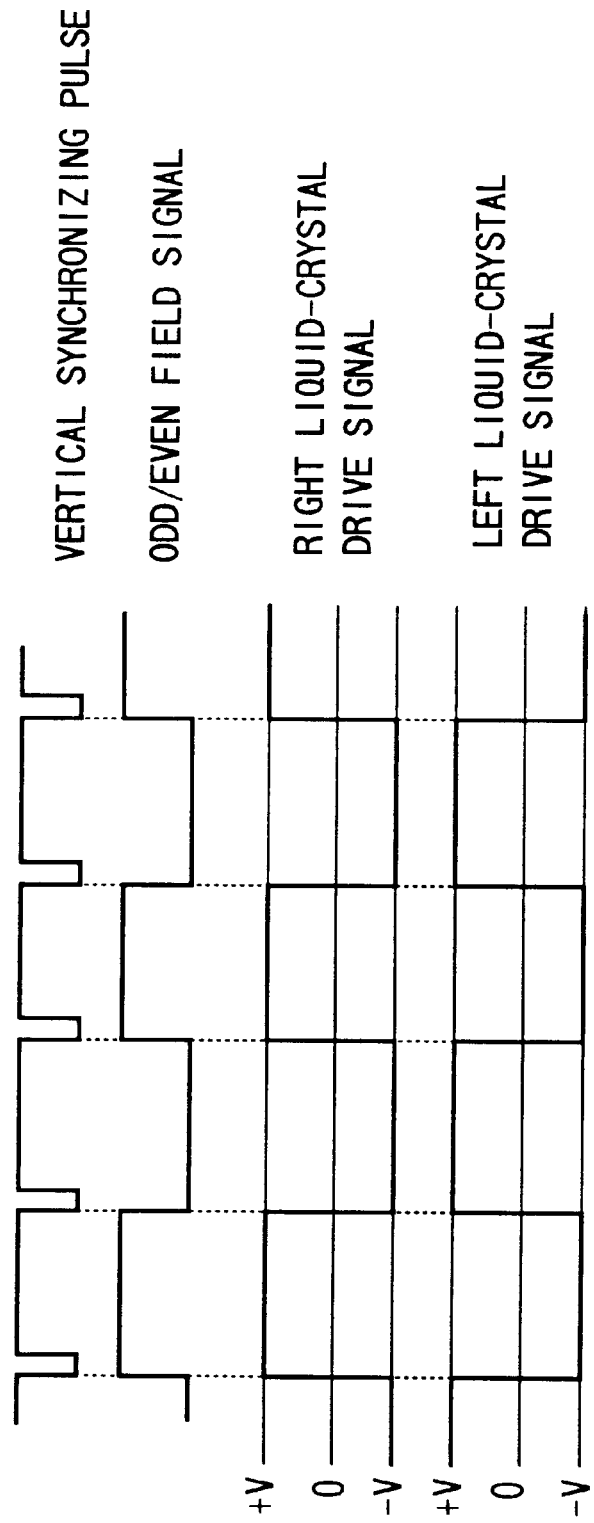
FIG. 12 is an explanatory diagram illustrating a drive signal of a liquid-crystal shutter of the second embodiment of the present invention.
Figure 13:
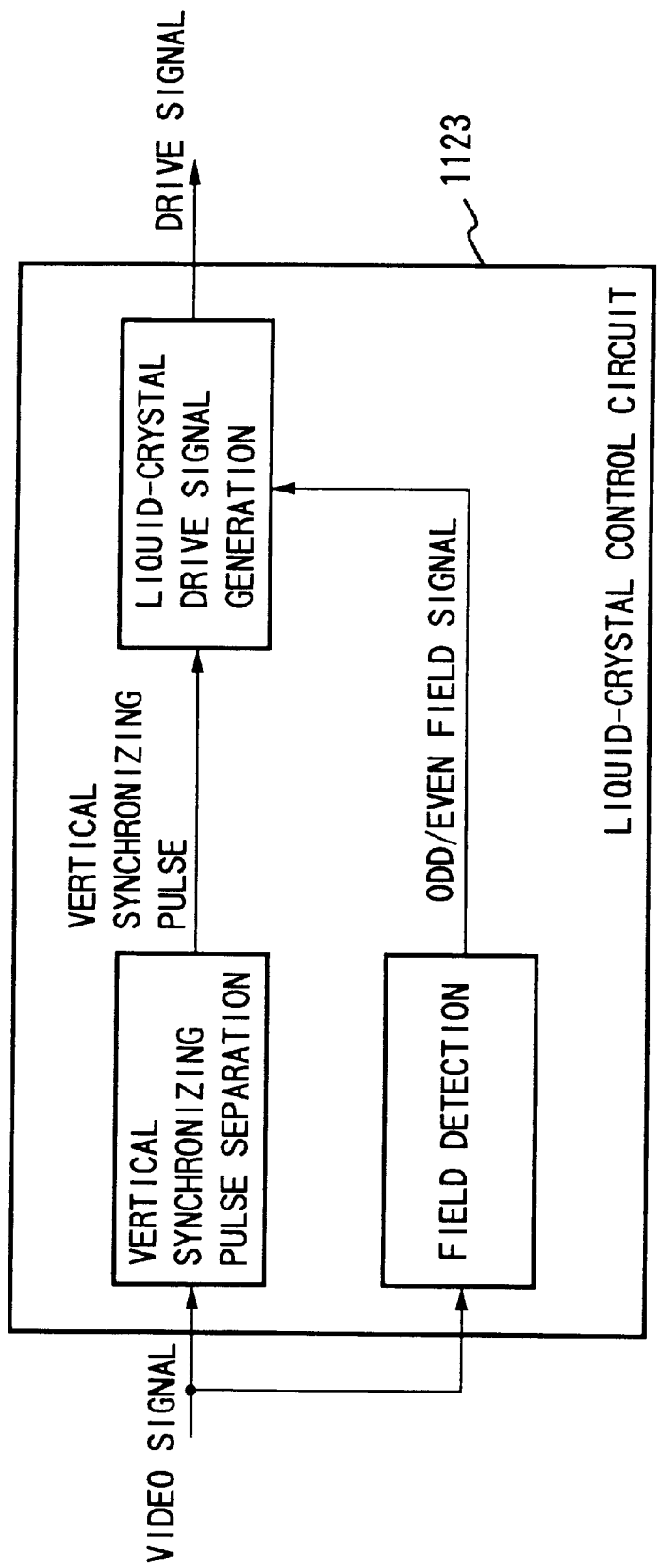
FIG. 13 is an explanatory diagram illustrating the generation process of the drive signal shown in FIG. 12.

The video signal in the second embodiment is an NTSC interlaced signal. A video signal of 60 fields per second is thus output. The vertical synchronizing pulse and horizontal synchronizing pulse of the video signal assures synchronization. The vertical synchronization pulse is superimposed at the head portion of each video signal of 60 fields. In the second embodiment, the liquid-crystal control circuit 1123 separates a vertical synchronization pulse at a rate of ¹⁄₆₀ second from the video signal input through the image input terminal 1128 as shown in FIG. 12 and FIG. 13. An odd/even field signal is derived from the input video signal to identify whether it is an odd field or an even field. The determination of the odd field or even field is made depending on whether the vertical synchronizing pulse coincides with the edge of the horizontal synchronizing pulse (odd field) or the vertical synchronizing pulse is delayed from the edge of the horizontal synchronizing pulse by ½ H (H is the horizontal synchronization period) (even field).

A left liquid-crystal drive signal for the left eye and right liquid-crystal drive signal for the right eye are derived from the vertical synchronization pulse and the odd/even field signal, and are output to CCD 1200 and the liquid-crystal control circuit 1123. Each of the left and right liquid-crystal drive signals is alternately reversed in logic value in a time-division manner, and provides image pick-up timing to CCD 1200 so that CCD 1200 picks up the left and right parallax images in a time-division manner.

Since the left and right liquid-crystal drive signals are fed to CCD 1200 and the liquid-crystal control circuit 1123, the time-division driving of the liquid crystals 1102 and 1105 is synchronized with the selection of the left and right parallax images by CCD 1200. Specifically, while CCD 1200 selectively picks up one parallax image, the liquid-crystal shutter corresponding to this parallax image is in its transmissive state while the other liquid-crystal shutter is in its non-transmissive state. As shown in FIG. 12, each liquid-crystal shutter stays in the non-transmissive state with a positive voltage applied thereon, while it stays in the transmissive state with a negative voltage applied thereon. The drive signals are applied to the liquid crystals 1102 and 1105 so that the left liquid crystal is in the transmissive state when the right liquid crystal is in the non-transmissive state and is in the non-transmissive state while the right liquid crystal is in the transmissive state. With this arrangement, when the liquid crystal 1102 is in the non-transmissive state, the image transmitted through the liquid crystal 1105 is picked up by the CCD 1200. When the liquid crystal 1105 is in the non-transmissive state, the image transmitted through the liquid crystal 1102 is picked up CCD 1200. Since the odd/even field signal is available as information in this embodiment, the left video signal is picked in the odd field while the right video signal is picked in the even field.

Through the above operation, CCD 1200 alternates between the left parallax image and the right parallax image to pick up 30 fields of the left parallax image and 30 screens of the right parallax images, a total of 60 fields of parallax images per second. The reading timing for reading image data from CCD 1200 is synchronized with the image picking, and the left parallax image signal and right parallax image signal are alternately output from the signal processing circuit 1207 as the video signal.

<Modification of the Second Embodiment>

Any known techniques may be used for the separation of the vertical synchronization pulse and the detection of the field. In the second embodiment, the video signal is fed to the liquid-crystal control circuit 1123 via the cable 1129. A signal indicative of vertical synchronization and information indicative of the odd/even field may be transmitted in the course of the predetermined data communication between the lens microcomputer 1127 and the camera microcomputer 1208.

Referring to FIG. 12, the rising edge of the right liquid-crystal drive signal and the falling edge of the left liquid-crystal drive signal are aligned in synchronization with the falling edge of the vertical synchronizing pulse. It will be perfectly acceptable if the rising edge of the right liquid-crystal drive signal and the falling edge of the left liquid-crystal drive signal are within the vertical blanking period (20H).

In the second embodiment, the left image signal is picked up during the odd field while the right image signal is picked up during the even field. Conversely, the left image signal picked up during the even field while the right image signal is picked up during the odd field.

The second embodiment employs a single EVF 1003. Since the image signal contains a time-series of left and right parallax images alternately appearing, the left and right parallax images are observed as a double image through EVF 1003. The left and right images from the time-division image signal may be presented on separate display means. An HMD having such function may be employed. The HMD may be used as the EVF. Alternatively, the EVF may be provided with the left image signal or right image signal only.

Figure 14:
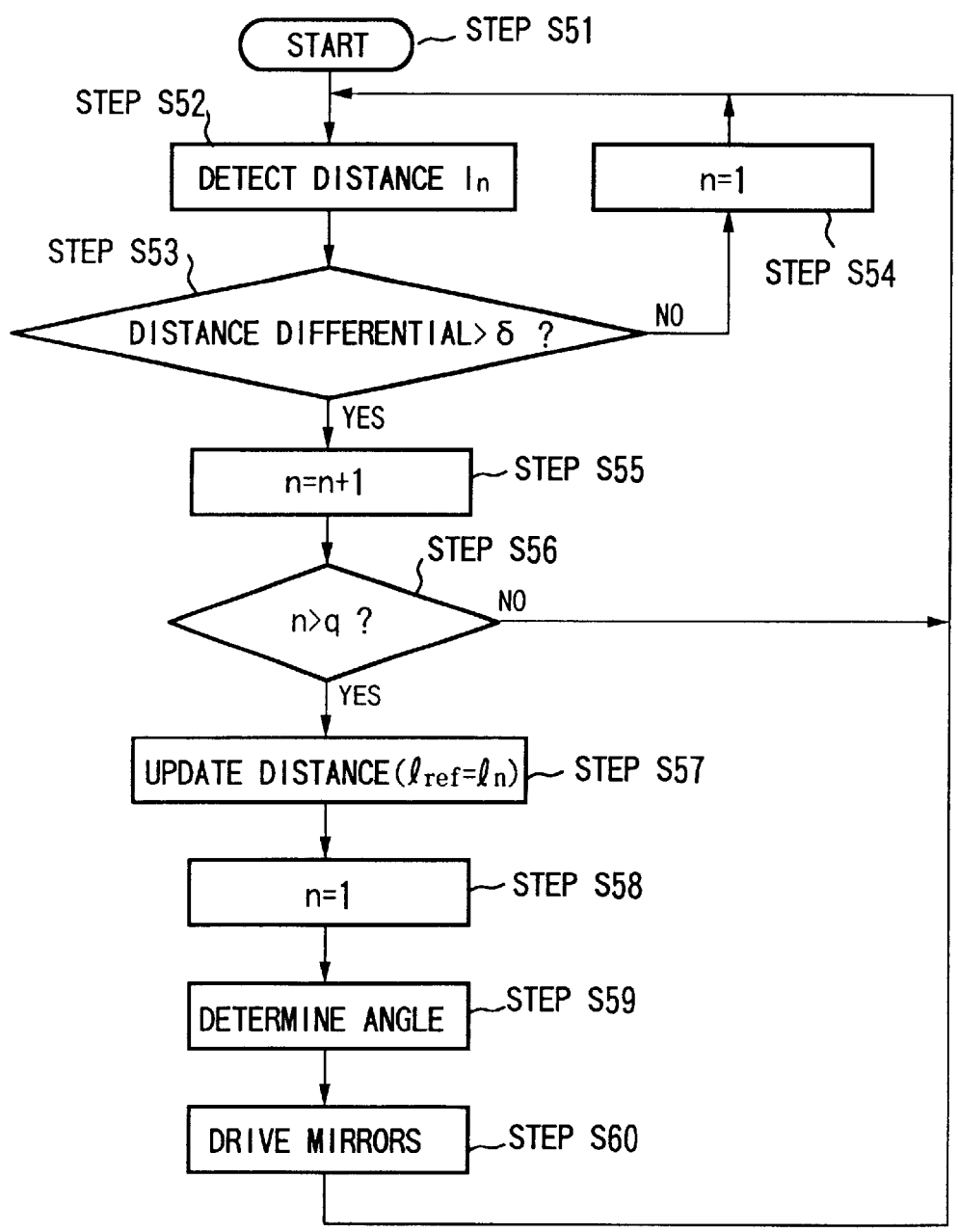
FIG. 14 is a flow diagram illustrating a convergence control according to the second embodiment of the present invention.

The distance l to the subject is variable. The image-fusible range is determined by the convergence angle and the subject distance, and a given convergence angle assures image fusion within a certain range of subject distance. If the subject distance varies greatly, the fusion condition may not be met. In other words, the convergence angle is preferably adjusted in accordance with the subject distance. The image pick-up apparatus of the second embodiment features an automatic convergence angle setting capability, in which a convergence angle is automatically set in accordance with a subject distance when the subject distance is put into a specified state. This convergence control is discussed referring to FIG. 14.

In step S51, the convergence control starts. This command is issued by the lens microcomputer 1127.

In step S52, a distance measuring unit 8 determines the distance l. Here, n represents the count at a counter.

In step S53, a determination is made of whether the absolute value of the differential between the distance $l_n$ determined in step S52 and the previously updated convergence distance $l_{ref}$, namely, $\Delta = l_n - l_{ref}$, is greater than a predetermined value δ. When it is determined that the absolute value of the differential is greater than the value δ, the lens microcomputer 1127 goes to step S55. When it is determined that the absolute value is not greater than the value δ, the lens microcomputer 1127 goes to step S54. By the absolute value of Δ>δ is meant that there is a great difference between the present subject distance $l_n$ and the previous subject distance.

When the present subject distance $l_n$ is not greatly different from the previous subject distance, the image input terminal 1128 resets the count of its counter to 1 in step S54.

When the present subject distance $l_n$ is greatly different from the previous distance, the lens microcomputer 1127 increments the count n of its counter by 1 in step S55.

In step S56, a determination is made of whether the value of n is greater than a threshold q. If the value of n is greater than the threshold q, the lens microcomputer 1127 goes to step S57. If the value of n is not greater than the threshold q, the lens microcomputer 1127 returns to step S52.

By YES in step S56 is meant that a change in the subject distance is equal to or greater than a distance δ×q. In such a case, the convergence distance $l_{ref}$ is updated with presently detected distance $l_n$ in step S57. In step S58, the counter is reset to 1. In step S59, the convergence angle corresponding to the convergence distance $l_{ref}$ is determined. Through the drivers 1010 and 1012, the lens microcomputer 1127 adjusts the angles of the mirror 1107 and 1112 until the convergence angle determined in step S59. The mirrors 1107 and 1112 are driven in the directions respectively represented by arrows 1013 and 1015. As a result, the optical axes 1004 and 1005 are deflected as represented by arrows 1014 and 1016, and thus converge at the convergence distance $l_{ref}$.

Through a series of process steps described above, the convergence is set to be variable when the number of occurrences of changes in the distance to the subject, each change greater than the predetermined value δ, is greater than a predetermined number of times.

The threshold δ and the number of times q may be determined depending on the lens system. In this embodiment, δ is determined in consideration of the current convergence, and the range of subject distance within which fusion is possible without fatigue involved. q is an integer multiple of the field frequency.

The following modification is also contemplated.

The triangulation is used in the distance measurement in the second embodiment. The present invention is not limited to this method. Distance measurement is performed detecting the position of each lens in each optical system. In in-focus state, the subject distance is measured based on the zoom values of the left and right optical systems.

<Advantages of the Second Embodiment>

The second embodiment permits the left and right parallax images to be picked up through a single lens set, without requiring two lens sets. The present invention thus implements compact and low-cost design in the apparatus, eliminates the characteristic difference between the left and right lenses, and picks up a high-quality stereoscopic image with the simple construction.

By arranging mirrors and liquid crystals symmetrically with respect to the lens optical axis, the optical path lengths of the left and right parallax images to the subject are equalized. With this arrangement, the image pick-up apparatus is thus free from a magnification difference between the left and right images, presenting a high-quality stereoscopic image. Since the left and right parallax images are picked up by a single pick-up device in the image pick-up system, no extra electronic circuit is required. Compact and low-cost design is thus implemented in the image pick-up apparatus.

As one of an interchangeable lens system, the lens of the system may be used, and the camera section needs no particular modification in order to pick up a stereoscopic image. An ordinary two-dimensional lens may be used in the same camera. This arrangement provides expandability and increases the merit of the camera. A plurality of lenses, including the lens for stereoscopic image picking and lenses of different specifications, for example, different focal lengths, may be commonly used on the same camera.

Since automating the convergence control reduces the load imposed on the user during image-capturing, the user is feasible to capture a high-quality stereoscopic image with less fatigue involved.

Although the present invention has been described with respect to preferred embodiments, many variations and modifications will be apparent to those skilled in the art and may be made without departing from the scope of this invention as set forth in appended claims.

What is claimed is:

1. An image pick-up apparatus for capturing images for stereoscopic viewing, comprising:

image pick-up means for picking up left and right parallax images of a main subject respectively for the left and right eyes;

display means for displaying the left and right parallax images, picked up by said image pick-up means;

line-of-sight detection means for detecting the lines of sight of the left and right eyes looking toward the respective images displayed by said display means; and determining means for determining, based on the output of said line-of-sight detection means, whether said main subject falls within an image-fusible range by determining a distal limit based on human-pupillary distance limit and a proximal limit based on distance of distinct vision of human eyes.

2. An image pick-up apparatus according to claim 1, further comprising informing means for informing a user of a determination result provided by said determining means.

3. An image pick-up apparatus according to claim 2, wherein said informing means displays said determination result.

4. An image pick-up apparatus according to claim 1, wherein said determining means defines said image-fusible range according to the inter-pupillary distance and the distance of distinct vision of a user.

5. An image pick-up apparatus according to claim 1, wherein the output of said image pick-up means is stored in a memory in response to the output of said determining means.

6. An image pick-up apparatus according to claim 1, wherein said line-of-sight detection means further comprises:

converting means for converting the left and right lines of sight of a user into left and right direction vectors that are respectively expressed in left and right coordinate systems of said image pick-up means; and coordinates calculator means for calculating the coordinate values of the crossing point of the left and right direction vectors in the world coordinate system.

7. An image pick-up apparatus according to claim 6, wherein said determining means determines whether the calculated coordinate values of the crossing point in the world coordinate system fall within said image-fusible range.

8. An image pick-up apparatus according to claim 1, wherein said determining means expresses said image-fusible range according to a farthest position and a nearest position from the view point of a user in the direction of depth.

9. An image pick-up apparatus according to claim 8, wherein said determining means sets the farthest position of said image-fusible range to be a point so that the horizontal distance between two second points on the left and right image planes of said image pick-up means corresponding to a first point (A) of said farthest position is substantially equal to the inter-pupillary distance of the user.

10. An image pick-up apparatus according to claim 8, wherein said determining means sets the nearest position of said image-fusible range to be a point so that a position (C') where two points on the left and right image planes of said image pick-up means corresponding to a first point (C) of the nearest position, through perspective transformation based on the left and right view points of the user, look standing out to the user, is approximately equal to the point at the distance of distinct vision of the user.

11. An image pick-up apparatus according to claim 1, wherein said image display means and said line-of-sight detection means are built into a head-mounted display.

12. An image pick-up apparatus according to claim 11, wherein said head-mounted display comprises a light-emitting diode.

13. An image pick-up apparatus according to claim 1, wherein said image pick-up means comprises adjusting means for adjusting either the base line distance between said first and second optical systems or the convergence angle between said first and second optical systems, or for adjusting both the base line distance and the convergence angle.

14. An image pick-up method for capturing images for stereoscopic viewing, comprising:

the step of picking up left and right parallax images of a main subject respectively for the left and right eyes;

the step of displaying the picked left and right parallax images;

the step of detecting the lines of sight of the left and right eyes looking toward the respective displayed images; and the step of determining, based on the detected lines of sight of the eyes, whether said main subject falls within an image-fusible range by determining a distal limit based on human-pupillary distance limit and a proximal limit based on distance of distinct vision of human eyes.

15. An image pick-up method according to claim 14, further comprising the step of informing a user of the determination result of said determining step.

16. An image pick-up method according to claim 15, wherein said informing step displays said determination result.

17. An image pick-up method according to claim 14, wherein said determining step defines said image-fusible range according to the inter-pupillary distance and the distance of distinct vision of a user.

18. An image pick-up method according to claim 14, further comprising the step of storing the output of said image pick-up step in a memory in response to the output of said determining step.

19. An image pick-up method according to claim 14, wherein said step of detecting the lines of sight comprises the step of converting the left and right lines of sight of a user into left and right direction vectors that are respectively expressed in left and right coordinate systems in said image pick-up step; and the step of calculating the coordinate values of a crossing point of the left and right direction vectors in the world coordinate system.

20. An image pick-up method according to claim 19, wherein said determining step determines whether the calculated coordinate values of the crossing point in the world coordinate system fall within said image-fusible range.

21. An image pick-up method according to claim 14, wherein said determining step expresses said image-fusible range according to a farthest position and a nearest position from the view point of a user in the direction of depth.

22. An image pick-up method according to claim 21, wherein said determining step sets the farthest position of said image-fusible range to be a point so that the horizontal distance between two second points in left and right image planes of said image pick-up step corresponding to a first point (A) of said farthest position is substantially equal to the inter-pupillary distance of the user.

23. An image pick-up method according to claim 21, wherein said determining step sets the nearest position of said image-fusible range to be a point so that a position (C') where two points on the left and right image planes of said image pick-up step corresponding to a first point (C) of the nearest position, through perspective transformation based on the left and right view points of the user, look standing out to the user, is approximately equal to the point at the distance of distinct vision of the user.

24. An image pick-up apparatus comprising:

an image pick-up optical system for picking up a plurality of parallax images of an object;

a plurality of image display means, each having line-of-sight detection means for detecting lines of sight of a user;

converting means for converting lines of sight of the user into a plurality of direction vectors that are expressed in a coordinate system of said image pick-up optical system;

coordinates calculator means for calculating coordinate values of a crossing point of each of the direction vectors in the coordinate system;

distance calculator means for calculating a distance from view point of the user to the object based on the direction vectors;

image-pickable range calculator means for calculating a distal limit and a proximal limit of an image-pickable range; and comparator means for comparing the distance with the distal limit and the proximal limit of the image-pickable range.

25. An image pick-up apparatus according to claim 24, wherein said image display means comprises a pair of display unit and line-of-sight detector unit for the left eye and a pair of display unit and line-of-sight detector unit for the right eye.

26. An image pick-up apparatus for capturing images for stereoscopic viewing, comprising:

image pick-up means for picking up left and right parallax images of a main subject respectively for the left and right eyes;

line-of-sight detection means for detecting the lines of sight of the left and right eyes looking toward said main subject;

determining means for determining, based on the output of said line-of-sight detection means, whether said main subject falls within an image-fusible range; and recording means for recording, in accordance with the output of said determining means, the left parallax image signal and the right parallax image signal from said image pick-up means.

27. An image pick-up method for capturing images for stereoscopic viewing, comprising:

the image pick-up step of picking up left and right parallax images of a main subject respectively for the left and right eyes;

the line-of-sight detecting step of detecting the lines of sight of the left and right eyes, looking toward said main subject;

the determining step of determining, based on the output of said line-of-sight detecting step, whether said main subject falls within an image-fusible range; and the recording step of recording, in accordance with the output of said determining step, the left parallax image signal and the right parallax image signal obtained through said image pick-up step.

28. A computer readable recording medium for storing a program that is executed by a computer, wherein said medium stores a program that executes the method according to claim 14.

* * * * *